United States Patent
Li

(10) Patent No.: US 11,129,143 B2
(45) Date of Patent: Sep. 21, 2021

(54) WIRELESS COMMUNICATION METHOD, NETWORK DEVICE, USER EQUIPMENT, AND SYSTEM

(71) Applicant: Huawei Technologies Co., Ltd., Shenzhen (CN)

(72) Inventor: Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/779,142

(22) Filed: Jan. 31, 2020

(65) Prior Publication Data
US 2020/0170001 A1    May 28, 2020

Related U.S. Application Data

(63) Continuation of application No. 15/898,009, filed on Feb. 15, 2018, now Pat. No. 10,602,486, which is a
(Continued)

(51) Int. Cl.
*H04W 72/04* (2009.01)
*H04L 1/18* (2006.01)

(52) U.S. Cl.
CPC ....... *H04W 72/0406* (2013.01); *H04L 1/1861* (2013.01); *H04W 72/042* (2013.01); *H04W 72/0446* (2013.01)

(58) Field of Classification Search
CPC ............. H04W 72/04; H04W 72/0406; H04W 72/042; H04W 72/0446; H04L 1/18; H04L 1/1861
See application file for complete search history.

(56) References Cited

U.S. PATENT DOCUMENTS

2007/0254662 A1    11/2007 Khan et al.
2009/0257408 A1*  10/2009 Zhang ............... H04L 1/1635
                                                     370/336
(Continued)

FOREIGN PATENT DOCUMENTS

CN    101299821 A    11/2008
CN    102158981 A     8/2011
(Continued)

OTHER PUBLICATIONS

"New SI proposal: Study on Latency reduction techniques for LTE," 3GPP TSG RAN Meeting #67, Shanghai, China, RP-150465, 3rd Generation Partnership Project, Valbonne, France (Mar. 9-12, 2015).
(Continued)

*Primary Examiner* — Chi Ho A Lee
(74) *Attorney, Agent, or Firm* — Leydig, Voit & Mayer, Ltd.

(57) ABSTRACT

A wireless communication method, a network device, user equipment, and a system are provided. The method includes: generating, by a network device, control information, where the control information includes first indication information indicating a time domain resource for first transmission between user equipment and the network device, and duration of occupying a resource by one transmission of the first transmission is less than 1 millisecond; and sending, by the network device, the control information to the user equipment. The user equipment may obtain, according to the control information, the time domain resource for communicating with the network device by using the first transmission, and communicate with the network device on the obtained time domain resource. Therefore, a transmission time delay can be shortened, and user experience and radio network performance can be greatly improved.

20 Claims, 12 Drawing Sheets

Related U.S. Application Data continuation of application No. PCT/CN2015/087743, filed on Aug. 21, 2015.

(56) References Cited

U.S. PATENT DOCUMENTS

| | | |
|---|---|---|
| 2010/0015984 A1 | 1/2010 | Kazmi |
| 2011/0081932 A1 | 4/2011 | Astely et al. |
| 2012/0195292 A1 | 8/2012 | Ko et al. |
| 2013/0182569 A1 | 7/2013 | Bertrand et al. |
| 2013/0272196 A1 | 10/2013 | Li et al. |
| 2013/0343307 A1 | 12/2013 | Desai et al. |
| 2014/0022981 A1* | 1/2014 | Kim ............... H04L 5/0094 370/315 |
| 2014/0066056 A1* | 3/2014 | Zhu ............... H04W 4/023 455/432.3 |
| 2014/0133434 A1 | 5/2014 | Takeda et al. |
| 2014/0198664 A1* | 7/2014 | Chen ............... H04L 1/189 370/241 |
| 2014/0204856 A1* | 7/2014 | Chen ............... H04L 5/0053 370/329 |
| 2015/0003372 A1 | 1/2015 | Raaf et al. |
| 2015/0029903 A1* | 1/2015 | Chen ............... H04L 1/0078 370/277 |
| 2015/0043398 A1 | 2/2015 | Fwu et al. |
| 2015/0208413 A1 | 7/2015 | Takano |
| 2015/0237644 A1* | 8/2015 | Golitschek Edler von Elbwart ... H04W 72/042 370/329 |
| 2016/0119920 A1 | 4/2016 | Mallik et al. |
| 2016/0128090 A1 | 5/2016 | Yazdi et al. |
| 2016/0164643 A1* | 6/2016 | Loehr ............... H04L 1/1854 370/336 |
| 2016/0309466 A1 | 10/2016 | Chen et al. |
| 2016/0337931 A1* | 11/2016 | Wang ............... H04W 36/36 |
| 2016/0366720 A1 | 12/2016 | Wu |
| 2017/0019886 A1 | 1/2017 | Patel et al. |
| 2017/0048049 A1 | 2/2017 | Park |
| 2017/0048051 A1* | 2/2017 | Siomina ............... H04L 1/1825 |
| 2018/0019775 A1* | 1/2018 | Kim ............... H04L 1/12 |
| 2018/0049058 A1* | 2/2018 | Faronius ........... H04W 28/0257 |
| 2018/0213530 A1 | 7/2018 | Mochizuki et al. |

FOREIGN PATENT DOCUMENTS

| | | |
|---|---|---|
| CN | 102932838 A | 2/2013 |
| EP | 2744285 A1 | 6/2014 |
| EP | 2688261 B1 | 4/2017 |
| JP | 2010178130 A | 8/2010 |
| JP | 2013026641 A | 2/2013 |
| JP | 2013541299 A | 11/2013 |
| JP | 2015035827 A | 2/2015 |
| JP | 2015111847 A | 6/2015 |
| JP | 2016504798 A | 2/2016 |
| KR | 20120039331 A | 4/2012 |
| WO | 2013009088 A2 | 1/2013 |
| WO | 2014000644 A1 | 1/2014 |
| WO | 2014068278 A1 | 5/2014 |
| WO | 2014069057 A1 | 5/2014 |
| WO | 2014172306 A2 | 10/2014 |
| WO | 2017026159 A1 | 2/2017 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.6.0, 3rd Generation Partnership Project, Valbonne, France (Jun. 2015).

"3rd Generation Partnership Project; Technical Specification Group Radio Access Network; Evolved Universal Terrestrial Radio Access (E-UTRA); Multiplexing and channel coding (Release 12)," 3GPP TS 36.212 V12.5.0, 3rd Generation Partnership Project, Valbonne, France (Jun. 2015).

"3rd Generation Partnership Project; Technical Specification Group Radio Access Network; Evolved Universal Terrestrial Radio Access (E-UTRA); Physical layer procedures (Release 12)," 3GPP TS 36.213 V12.6.0, 3rd Generation Partnership Project, Valbonne, France (Jun. 2015).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.6.0, 3rd Generation Partnership Project, Valbonne, France (Jun. 2015).

"Study of shorter TTI for latency reduction," 3GPP TSG-RAN WG2#91, Tdoc R2-153493, 3rd Generation Partnership Project, Valbonne, France (Aug. 24-28, 2015).

JP/2018-509840, Office Action, dated Sep. 3, 2019.

KR 10-2018-7006911, Office Action, dated Mar. 10, 2019.

* cited by examiner

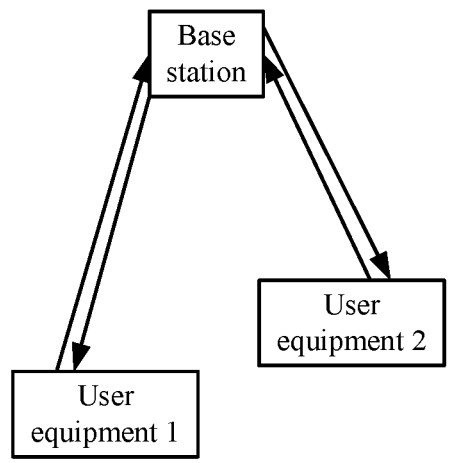

A network device generates control information, where the control information includes first indication information used to indicate a time domain resource for first transmission between user equipment and the network device, and duration of occupying a resource by one transmission of the first transmission is less than 1 millisecond ~ S1100

The network device sends the control information to the user equipment ~ S1200

FIG. 4

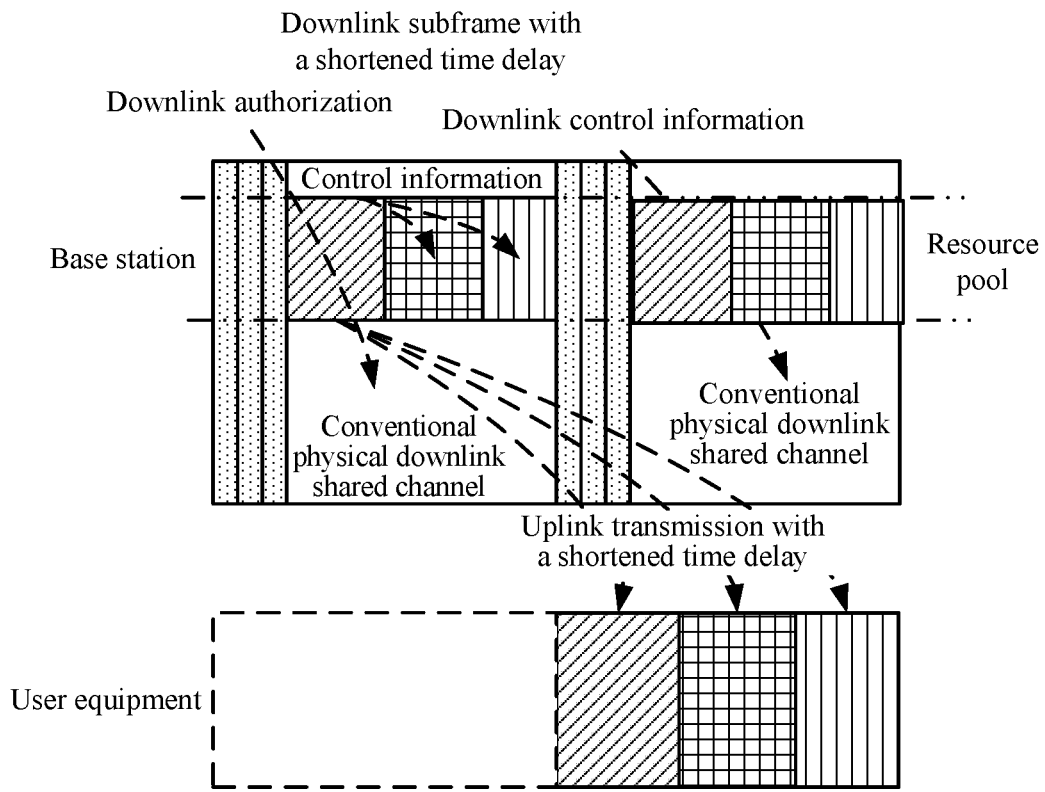

| User equipment receives control information sent by a network device, where the control information includes first indication information used to indicate a time domain resource for first transmission between the user equipment and the network device, and duration of occupying a resource by one transmission of the first transmission is less than 1 millisecond | S2100 |

| The user equipment communicates with the network device according to the control information | S2200 |

FIG. 7

Bind three independent sub transmission resources

Bind two independent sub transmission resources

WIRELESS COMMUNICATION METHOD, NETWORK DEVICE, USER EQUIPMENT, AND SYSTEM

CROSS-REFERENCE TO RELATED APPLICATIONS

This application is a continuation of U.S. patent application Ser. No. 15/898,009, filed on Feb. 15, 2018, which is a continuation of International Application No. PCT/CN2015/087743, filed on Aug. 21, 2015. All of the afore-mentioned patent applications are hereby incorporated by reference in their entireties.

TECHNICAL FIELD

Embodiments of the present application relate to the communications field, and more specifically, to a wireless communication method, a network device, user equipment, and a system.

BACKGROUND

In a Long Term Evolution (LTE) protocol, frame structures are classified into a frequency division duplex (FDD) frame structure and a time division duplex (TDD) frame structure, as shown in FIG. 1 and FIG. 2. For the two types of frame structures, a basic unit is a 1 ms subframe including two timeslots (slot). Each timeslot occupies a time of 0.5 ms. A radio frame occupies a time of 10 ms. During transmission, a minimum time unit used to send data is a 1 ms subframe. That is, in a transmission process, to-be-transceived data of specific user equipment (UE) needs to be mapped onto a resource in a time unit of 1 ms, and data generated after mapping onto a 1 ms subframe is completed is transmitted. Further, in a design of an entire LTE system, considering limitations of a UE side on reception and a processing time delay of a maximum data packet of 1 ms, after receiving data on a subframe n, UE can perform corresponding sending only at a location of a subframe n+k, where k≥4. Therefore, during one uplink transmission, a round trip time (RTT) required from a time when a base station schedules uplink data, to a time when data is transmitted in downlink, and then to a time when the base station provides a corresponding feedback is not less than 8 ms.

In a TDD system, different subframes are occupied in uplink and downlink. Therefore, an RTT is generally greater than 8 ms. For example, the RTT reaches 13 ms or 16 ms for some TDD configurations. 8 ms is a minimum air interface time delay required for an RTT of single transmission. If a signaling interaction procedure of a service in a transmission process is considered, for example, M interactions are performed, a minimum time delay of 8M (ms) exists from a time when the service is initiated to a time when the service formally starts to be transmitted. If M=10, a time delay of 80 ms is required. This greatly affects user experience and radio network performance.

SUMMARY

Embodiments of the present application provide a wireless communication method, a network device, user equipment, and a system, so that a transmission time delay can be shortened, and user experience and radio network performance can be improved.

According to a first aspect, a wireless communication method is provided, including: generating, by a network device, control information, where the control information includes first indication information used to indicate a time domain resource for first transmission between user equipment and the network device, and duration of occupying a resource by one transmission of the first transmission is less than 1 millisecond; and sending, by the network device, the control information to the user equipment.

With reference to the first aspect, in a first possible implementation of the first aspect, the control information carries a radio network temporary identity (RNTI) related to the first transmission.

With reference to the first aspect or the first possible implementation of the first aspect, in a second possible implementation of the first aspect, the sending the control information to the user equipment includes: sending physical downlink control channel (PDCCH) information to the user equipment by using the first M time domain symbols in a first subframe, where the PDCCH information includes the control information, M is a positive integer, and other time domain symbols, excluding the first M time domain symbols, in time domain symbols included in the first subframe are allocated to multiple user equipments.

With reference to the first aspect or the first possible implementation of the first aspect, in a third possible implementation of the first aspect, the sending the control information to the user equipment includes: sending a physical downlink shared channel (PDSCH) to the user equipment by using N time domain symbols in a second subframe, where the first K time domain symbols of the N time domain symbols carry the control information, and N and K are positive integers.

With reference to the second possible implementation of the first aspect, in a fourth possible implementation of the first aspect, the first indication information indicates time domain symbols that are in the first subframe and that are occupied by the time domain resource, and the time domain symbols indicated by the first indication information do not include the time domain symbols occupied by the PDCCH information.

With reference to the third possible implementation of the first aspect, in a fifth possible implementation of the first aspect, the first indication information indicates time domain symbols that are in the second subframe and that are occupied by the time domain resource, and the time domain symbols indicated by the first indication information do not include time domain symbols occupied by a PDCCH or the first K time domain symbols.

With reference to the first aspect or the first possible implementation of the first aspect, in a sixth possible implementation of the first aspect, the first indication information indicates a time domain symbol set corresponding to time domain symbols that are in a subframe and that are occupied by the time domain resource.

With reference to any one of the first aspect, or the first to the sixth possible implementations of the first aspect, in a seventh possible implementation of the first aspect, the control information further includes at least one of the following information: identification information used to indicate a process number of a hybrid automatic repeat request (HARQ) corresponding to the first transmission, or second indication information used to indicate a retransmission redundancy version corresponding to the first transmission.

According to a second aspect, a wireless communication method is provided, including: receiving, by user equipment, control information sent by a network device, where the control information includes first indication information used to indicate a time domain resource for first transmission between the user equipment and the network device, and duration of occupying a resource by one transmission of the first transmission is less than 1 millisecond; and communicating, by the user equipment, with the network device according to the control information.

With reference to the second aspect, in a first possible implementation of the second aspect, the control information carries a radio network temporary identity (RNTI) related to the first transmission.

With reference to the second aspect or the first possible implementation of the second aspect, in a second possible implementation of the second aspect, the receiving control information sent by a network device includes: receiving, on the first M time domain symbols in a first subframe, physical downlink control channel (PDCCH) information sent by the network device, where the PDCCH information includes the control information, M is a positive integer, and other time domain symbols, excluding the first M time domain symbols, in time domain symbols included in the first subframe are allocated to multiple user equipments.

With reference to the second aspect or the first possible implementation of the second aspect, in a third possible implementation of the second aspect, the receiving control information sent by a network device includes: receiving, on N time domain symbols in a second subframe, a physical downlink shared channel (PDSCH) sent by the network device, where the first K time domain symbols of the N time domain symbols carry the control information, and N and K are positive integers.

With reference to the second possible implementation of the second aspect, in a fourth possible implementation of the second aspect, the first indication information indicates time domain symbols that are in the first subframe and that are occupied by the time domain resource, and the time domain symbols indicated by the first indication information do not include the time domain symbols occupied by the PDCCH information.

With reference to the third possible implementation of the second aspect, in a fifth possible implementation of the second aspect, the first indication information indicates time domain symbols that are in the second subframe and that are occupied by the time domain resource, and the time domain symbols indicated by the first indication information do not include time domain symbols occupied by a PDCCH or the first K time domain symbols.

With reference to the second aspect or the first possible implementation of the second aspect, in a sixth possible implementation of the second aspect, the first indication information indicates a time domain symbol set corresponding to time domain symbols that are in a subframe and that are occupied by the time domain resource.

With reference to any one of the second aspect, or the first to the sixth possible implementations of the second aspect, in a seventh possible implementation of the second aspect, the control information further includes at least one of the following information: identification information used to indicate a process number of a hybrid automatic repeat request (HARQ) corresponding to the first transmission, or second indication information used to indicate a retransmission redundancy version corresponding to the first transmission.

According to a third aspect, a wireless communication method is provided, including: sending, by a network device, uplink transmission resource indication information to user equipment; and receiving, by the network device, data packets that are sent by the user equipment on at least two independent sub transmission resources included in an uplink transmission resource, where the uplink transmission resource is determined by the user equipment according to the uplink transmission resource indication information, and a granularity, in a time domain, of each of the at least two independent sub transmission resources is a preset symbol quantity.

With reference to the third aspect, in a first possible implementation of the third aspect, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

With reference to the third aspect, in a second possible implementation of the third aspect, the uplink transmission resource indication information indicates that the uplink transmission resource is all or a part of a remaining resource, excluding a resource occupied by a physical downlink control channel (PDCCH), in a first subframe.

With reference to the third aspect, in a third possible implementation of the third aspect, the uplink transmission resource indication information indicates that the uplink transmission resource includes a part of a remaining resource, excluding a resource occupied by a PDCCH, in each subframe of M consecutive subframes, where M is an integer greater than or equal to 2; or the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N−K subframes of the N consecutive subframes, where N and K are integers greater than or equal to 1.

According to a fourth aspect, a wireless communication method is provided, including: receiving, by user equipment, uplink transmission resource indication information sent by a network device; determining, by the user equipment, an uplink transmission resource according to the uplink transmission resource indication information, where the uplink transmission resource includes at least two independent sub transmission resources, and a granularity, in a time domain, of each of the at least two independent sub transmission resources is a preset symbol quantity; and sending, by the user equipment, data packets to the network device on the at least two independent sub transmission resources.

With reference to the fourth aspect, in a first possible implementation of the fourth aspect, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

With reference to the fourth aspect, in a second possible implementation of the fourth aspect, the uplink transmission resource indication information indicates that the uplink transmission resource is all or a part of a remaining resource, excluding a resource occupied by a physical downlink control channel (PDCCH), in a first subframe.

With reference to the fourth aspect, in a third possible implementation of the fourth aspect, the uplink transmission resource indication information indicates that the uplink transmission resource includes a part of a remaining resource, excluding a resource occupied by a PDCCH, in each subframe of M consecutive subframes, where M is an integer greater than or equal to 2; or the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N−K subframes of the N consecutive subframes, where N and K are integers greater than or equal to 1.

According to a fifth aspect, a network device is provided, including: an information generation module, configured to generate control information, where the control information includes first indication information used to indicate a time domain resource for first transmission between user equipment and the network device, and duration of occupying a resource by one transmission of the first transmission is less than 1 millisecond; and a sending module, configured to send the control information to the user equipment.

With reference to the fifth aspect, in a first possible implementation of the fifth aspect, the control information carries a radio network temporary identity (RNTI) related to the first transmission.

With reference to the fifth aspect or the first possible implementation of the fifth aspect, in a second possible implementation of the fifth aspect, that the sending module sends the control information to the user equipment includes: sending physical downlink control channel (PDCCH) information to the user equipment by using the first M time domain symbols in a first subframe, where the PDCCH information includes the control information, M is a positive integer, and other time domain symbols, excluding the first M time domain symbols, in time domain symbols included in the first subframe are allocated to multiple user equipments.

With reference to the fifth aspect or the first possible implementation of the fifth aspect, in a third possible implementation of the fifth aspect, that the sending module sends the control information to the user equipment includes: sending a physical downlink shared channel (PDSCH) to the user equipment by using N time domain symbols in a second subframe, where the first K time domain symbols of the N time domain symbols carry the control information, and N and K are positive integers.

With reference to the second possible implementation of the fifth aspect, in a fourth possible implementation of the fifth aspect, the first indication information indicates time domain symbols that are in the first subframe and that are occupied by the time domain resource, and the time domain symbols indicated by the first indication information do not include the time domain symbols occupied by the PDCCH information.

With reference to the third possible implementation of the fifth aspect, in a fifth possible implementation of the fifth aspect, the first indication information indicates time domain symbols that are in the second subframe and that are occupied by the time domain resource, and the time domain symbols indicated by the first indication information do not include time domain symbols occupied by a PDCCH or the first K time domain symbols.

With reference to the fifth aspect or the first possible implementation of the fifth aspect, in a sixth possible implementation of the fifth aspect, the first indication information indicates a time domain symbol set corresponding to time domain symbols that are in a subframe and that are occupied by the time domain resource.

With reference to any one of the fifth aspect, or the first to the sixth possible implementations of the fifth aspect, in a seventh possible implementation of the fifth aspect, the control information further includes at least one of the following information: identification information used to indicate a process number of a hybrid automatic repeat request (HARQ) corresponding to the first transmission, or second indication information used to indicate a retransmission redundancy version corresponding to the first transmission.

According to a sixth aspect, user equipment is provided, including: a transceiver module, configured to receive control information sent by a network device, where the control information includes first indication information used to indicate a time domain resource for first transmission between the user equipment and the network device, and duration of occupying a resource by one transmission of the first transmission is less than 1 millisecond; and a processing module, configured to control the transceiver module to communicate with the network device according to the control information.

With reference to the sixth aspect, in a first possible implementation of the sixth aspect, the control information carries a radio network temporary identity (RNTI) related to the first transmission.

With reference to the sixth aspect or the first possible implementation of the sixth aspect, in a second possible implementation of the sixth aspect, that the transceiver module receives the control information sent by the network device includes: receiving, on the first M time domain symbols in a first subframe, physical downlink control channel (PDCCH) information sent by the network device, where the PDCCH information includes the control information, M is a positive integer, and other time domain symbols, excluding the first M time domain symbols, in time domain symbols included in the first subframe are allocated to multiple user equipments.

With reference to the sixth aspect or the first possible implementation of the sixth aspect, in a third possible implementation of the sixth aspect, that the transceiver module receives the control information sent by the network device includes: receiving, on N time domain symbols in a second subframe, a physical downlink shared channel (PDSCH) sent by the network device, where the first K time domain symbols of the N time domain symbols carry the control information, and N and K are positive integers.

With reference to the second possible implementation of the sixth aspect, in a fourth possible implementation of the sixth aspect, the first indication information indicates time domain symbols that are in the first subframe and that are occupied by the time domain resource, and the time domain symbols indicated by the first indication information do not include the time domain symbols occupied by the PDCCH information.

With reference to the third possible implementation of the sixth aspect, in a fifth possible implementation of the sixth aspect, the first indication information indicates time domain symbols that are in the second subframe and that are occupied by the time domain resource, and the time domain symbols indicated by the first indication information do not include time domain symbols occupied by a PDCCH or the first K time domain symbols.

With reference to the sixth aspect or the first possible implementation of the sixth aspect, in a sixth possible implementation of the sixth aspect, the first indication information indicates a time domain symbol set corresponding to time domain symbols that are in a subframe and that are occupied by the time domain resource.

With reference to any one of the sixth aspect, or the first to the sixth possible implementations of the sixth aspect, in a seventh possible implementation of the sixth aspect, the control information further includes at least one of the following information: identification information used to indicate a process number of a hybrid automatic repeat request (HARQ) corresponding to the first transmission, or second indication information used to indicate a retransmission redundancy version corresponding to the first transmission.

According to a seventh aspect, a network device is provided, including: a sending module, configured to send uplink transmission resource indication information to user equipment; and a receiving module, configured to receive data packets that are sent by the user equipment on at least two independent sub transmission resources included in an uplink transmission resource, where the uplink transmission resource is determined by the user equipment according to the uplink transmission resource indication information, and a granularity, in a time domain, of each of the at least two independent sub transmission resources is a preset symbol quantity.

With reference to the seventh aspect, in a first possible implementation of the seventh aspect, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

With reference to the seventh aspect, in a second possible implementation of the seventh aspect, the uplink transmission resource indication information indicates that the uplink transmission resource is all or a part of a remaining resource, excluding a resource occupied by a physical downlink control channel (PDCCH), in a first subframe.

With reference to the seventh aspect, in a third possible implementation of the seventh aspect, the uplink transmission resource indication information indicates that the uplink transmission resource includes a part of a remaining resource, excluding a resource occupied by a PDCCH, in each subframe of M consecutive subframes, where M is an integer greater than or equal to 2; or the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N–K subframes of the N consecutive subframes, where N and K are integers greater than or equal to 1.

According to an eighth aspect, user equipment is provided, including: a transceiver module, configured to receive uplink transmission resource indication information sent by a network device; and a determining module, configured to determine an uplink transmission resource according to the uplink transmission resource indication information, where the uplink transmission resource includes at least two independent sub transmission resources, and a granularity, in a time domain, of each of the at least two independent sub transmission resources is a preset symbol quantity, where the transceiver module is further configured to send data packets to the network device on the at least two independent sub transmission resources.

With reference to the eighth aspect, in a first possible implementation of the eighth aspect, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

With reference to the eighth aspect, in a second possible implementation of the eighth aspect, the uplink transmission resource indication information indicates that the uplink transmission resource is all or a part of a remaining resource, excluding a resource occupied by a physical downlink control channel (PDCCH), in a first subframe.

With reference to the eighth aspect, in a third possible implementation of the eighth aspect, the uplink transmission resource indication information indicates that the uplink transmission resource includes a part of a remaining resource, excluding a resource occupied by a PDCCH, in each subframe of M consecutive subframes, where M is an integer greater than or equal to 2; or the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N–K subframes of the N consecutive subframes, where N and K are integers greater than or equal to 1.

According to a ninth aspect, a wireless communications system is provided, including the network device according to any one of the fifth aspect, or the first to the seventh possible implementations of the fifth aspect, and the user equipment according to any one of the sixth aspect, or the first to the seventh possible implementations of the sixth aspect.

According to a tenth aspect, a wireless communications system is provided, including the network device according to any one of the seventh aspect, or the first to the third possible implementations of the seventh aspect, and the user equipment according to any one of the eighth aspect, or the first to the third possible implementations of the eighth aspect.

Based on the foregoing technical features, according to the wireless communication method, the network device, the user equipment, and the system that are provided in the embodiments of the present application, the network device sends, to the user equipment, the control information including the first indication information that is used to indicate the time domain resource for the first transmission between the user equipment and the network device. The user equipment may obtain, according to the control information, the time domain resource for communicating with the network device by using the first transmission, and communicate with the network device on the obtained time domain resource. The duration of occupying the resource by the one transmission of the first transmission is less than 1 ms. This can reduce a transmission time delay in a communication process, and improve user experience and radio network performance.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIG. 3 is a schematic architectural diagram of a communications system to which an embodiment of the present application is applied;

FIG. 4 is a schematic flowchart of a wireless communication method according to an embodiment of the present application;

FIG. 6 is a schematic diagram of a location at which control information is carried according to another embodiment of the present application;

FIG. 7 is a schematic flowchart of a wireless communication method according to another embodiment of the present application;

DESCRIPTION OF EMBODIMENTS

Figure 1:
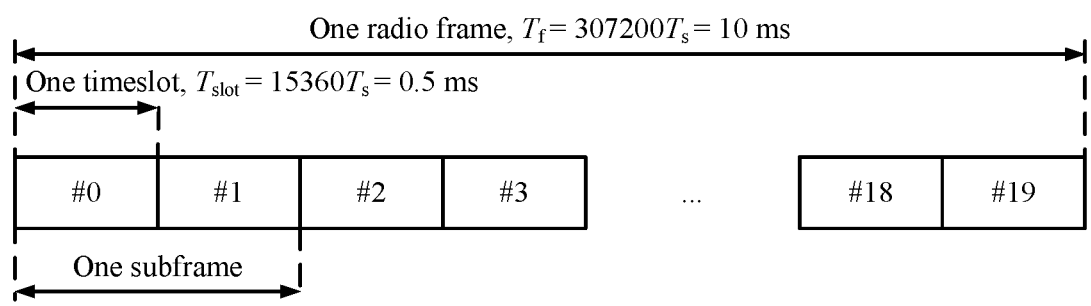
FIG. 1 is a schematic diagram of a frame structure of a frequency division duplex radio frame in the prior art.
Figure 2:
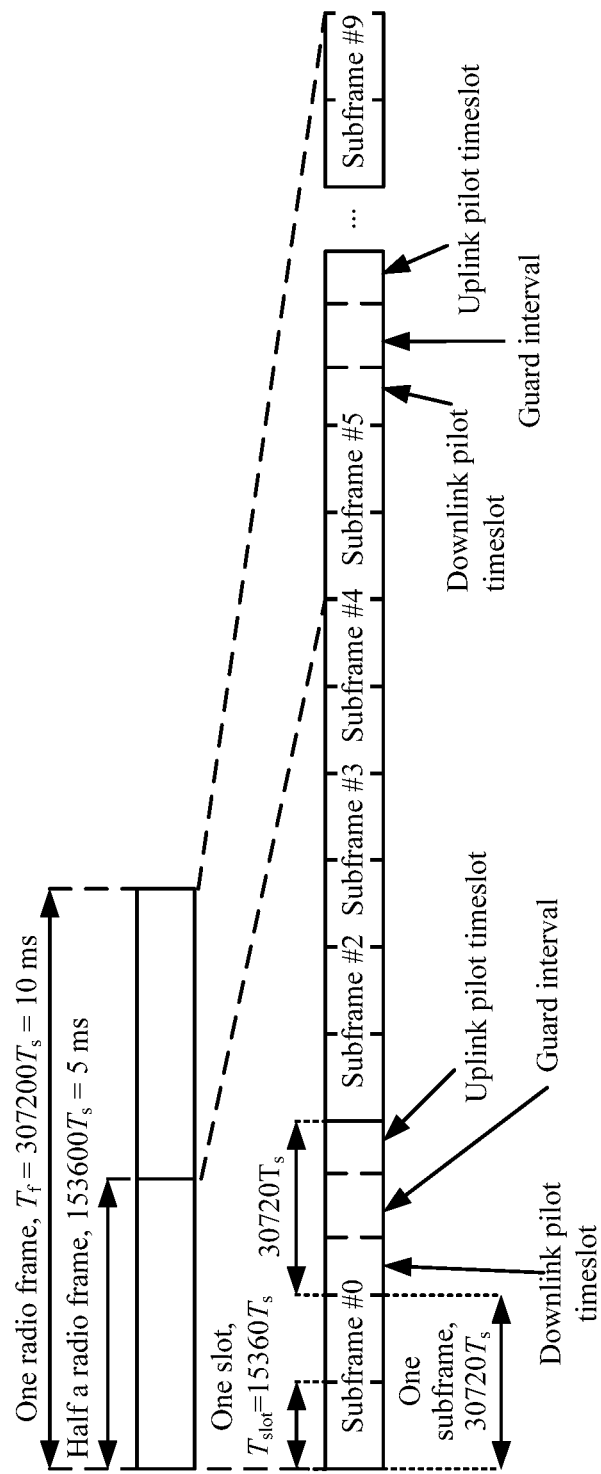
FIG. 2 is a schematic diagram of a frame structure of a time division duplex radio frame in the prior art.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

It should be understood that the technical solutions of the embodiments of the present application may be applied to various communications systems, such as a Global System for Mobile Communications (GSM) system, a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD), a Universal Mobile Telecommunications System (UMTS), and a future 5G communications system.

It should be understood that, in the embodiments of the present application, user equipment may also be referred to as terminal equipment (Terminal Equipment), a mobile station (MS), a mobile terminal (Mobile Terminal), or the like. The user equipment may communicate with one or more core networks by using a radio access network (RAN). For example, the user equipment may be a mobile phone (or referred to as a "cellular" phone) or a computer with a mobile terminal. For example, the user equipment may be a portable, pocket-sized, handheld, computer built-in, or in-vehicle mobile apparatus, a terminal device in a future 5G network, or a terminal device in a future evolved PLMN network.

It should be further understood that, in the embodiments of the present application, a network device may be a device configured to communicate with user equipment. The network device may be a base transceiver station (BTS) in a GSM system or a CDMA system, may be a NodeB (NB) in a WCDMA system, or may be an evolved NodeB (eNB) in an LTE system. Alternatively, the network device may be a relay station, an access point, an in-vehicle device, a wearable device, a network-side device in a future 5G network, a network device in a future evolved PLMN network, or the like.

FIG. 3 is a schematic diagram of an application scenario according to an embodiment of the present application. As shown in FIG. 3, there are multiple user equipments UEs within a scope of a base station eNB. The base station performs wireless communication with the multiple UEs. The eNB may schedule, according to a service requirement, a resource, and a scheduling status, different transmission modes for UE 1 and UE 2, to improve transmission performance and efficiency.

It should be noted that a case in which there is only one base station (an isolated base station) is shown in the scenario shown in FIG. 3. However, the present application is not limited thereto. The base station may further have an adjacent base station and user equipment that transmit a service on a same time-frequency resource.

It should be noted that a time-frequency resource may be generally a communication resource. For example, the time-frequency resource may be a communication resource having a time dimension and a frequency dimension. A minimum unit of the time-frequency resource is not limited in the embodiments of the present application. For example, the minimum unit of the time-frequency resource may be a subframe, a frame, or a timeslot from a time perspective, or may be a subband, an entire operating band, or a subcarrier from a frequency perspective. A time-frequency dimension may be a resource block ("RB" for short), a resource element (RE), or the like.

It should be noted that, for ease of description, in the embodiments of the present application, transmission in which a time of occupying a transmission resource by one transmission in an existing LTE system is referred to as transmission with a time delay not shortened, and a subframe in which all resources of a 1 ms subframe are used for transmission with a time delay not shortened is referred to as a subframe with a time delay not shortened. In the embodiments of the present application, first transmission is relative to the transmission with a time delay not shortened in the LTE system. In the embodiments of the present application, a time of occupying a transmission resource by one transmission of the first transmission is less than 1 ms. The first transmission in the embodiments of the present application may be referred to as transmission with a shortened time delay (Shortened Time Delay Transmission). One transmission (or referred to as "single transmission") means that a network device or user equipment performs sending or reception once on a resource actually occupied in a 1 ms subframe during the first transmission. A subframe in which all resources of the entire 1 ms subframe are used for transmission with a shortened time delay, or a subframe in which all physical downlink shared channel (PDSCH) resources of the entire 1 ms subframe are used for transmission with a shortened time delay may be referred to as a subframe with a shortened time delay. However, the protection scope of the present application is not limited to the name.

The subframe with a shortened time delay in the embodiments of the present application may be all subframes in the existing LTE system. Preferably, a subframe in the embodiments of the present application is one or more subframes in a Multicast/Broadcast over Single Frequency Network (MBSFN) subframe set. In a frequency division duplex FDD mode, numbers of subframes included in the MBSFN subframe set are 1, 2, 3, 6, 7, and 8; and in a time division duplex TDD mode, numbers of subframes included in the MBSFN subframe set are 3, 4, 7, 8, and 9. This can ensure that user equipment not performing transmission with a shortened time delay does not send data on a subframe with a shortened time delay.

Two cases are included when the subframe with a shortened time delay in the embodiments of the present application is actually used. In a case 1, in a subframe, all resources that are in a frequency domain and that are on another symbol excluding a symbol of a control channel on which a physical downlink control channel (PDCCH) is located are used for transmission with a shortened time delay. In a case 2, in a subframe, a part of a subband or bandwidth that is in a frequency domain and that is on another symbol excluding a symbol of a control channel on which a PDCCH is located is used for transmission with a shortened time delay. In the case 1, the subframe may be referred to as a dedicated subframe with a shortened time delay. In the case 2, the subframe may be referred to as a subframe with a subband whose time delay is shortened. During the transmission in the embodiments of the present application, a type of the so-called subframe with a shortened time delay may be any one of the foregoing subframes or a combination of the foregoing two subframes (that is, in configured subframes, some subframes are dedicated subframes with a shortened time delay, and some are subframes with a subband whose time delay is shortened).

FIG. 4 is a schematic flowchart of a wireless communication method according to an embodiment of the present application. The method may be executed by a network device. As shown in FIG. 4, the method 1000 includes the following steps:

S1100. A network device generates control information, where the control information includes first indication information used to indicate a time domain resource for first transmission between user equipment and the network device, and duration of occupying a resource by one transmission of the first transmission is less than 1 millisecond.

S1200. The network device sends the control information to the user equipment.

Specifically, the network device generates the control information including the first indication information that is used to indicate the time domain resource for the first transmission between the user equipment and the network device, and sends the control information to the user equipment. The duration of occupying the resource by the one transmission of the first transmission is less than 1 ms.

Therefore, according to the wireless communication method in this embodiment of the present application, the network device sends, to the user equipment, the control information including the first indication information that is used to indicate the time domain resource for the first transmission between the user equipment and the network device. The user equipment may obtain, according to the control information, the time domain resource for communicating with the network device by using the first transmission, and communicate with the network device on the obtained time domain resource. The duration of occupying the resource by the one transmission of the first transmission is less than 1 ms. This can reduce a transmission time delay in a communication process, and improve user experience.

Optionally, in S1100, the control information further includes at least one of the following information: identification information used to indicate a process number of a hybrid automatic repeat request (HARQ) corresponding to the first transmission, or second indication information used to indicate a retransmission redundancy version corresponding to the first transmission.

Optionally, in S1100, the control information carries a radio network temporary identity (RNTI) related to the first transmission. The user equipment may determine, according to the radio network temporary identity (RNTI) related to the first transmission, that the time domain resource indicated by the control information is a resource used for the first transmission.

Optionally, S1200 is specifically: sending physical downlink control channel (PDCCH) information to the user equipment by using the first M time domain symbols in a first subframe, where the PDCCH information includes the control information, M is a positive integer, and other time domain symbols, excluding the first M time domain symbols, in time domain symbols included in the first subframe are allocated to multiple user equipments.

Figure 5:
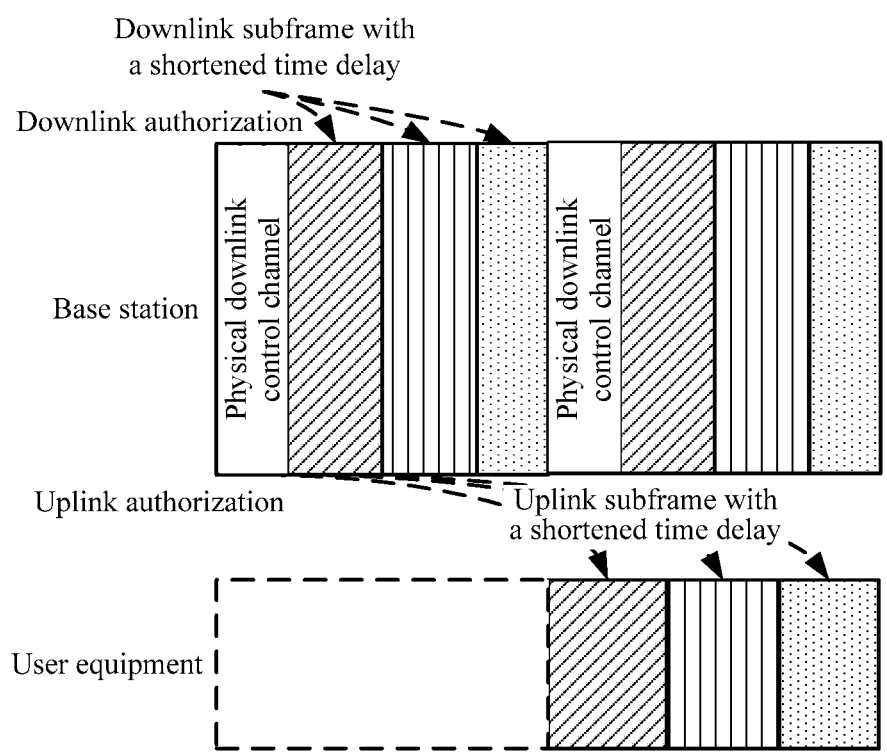
FIG. 5 is a schematic diagram of a location at which control information is carried according to an embodiment of the present application.

That is, as shown in FIG. 5, the network device may add the control information onto a PDCCH channel. In each 1 ms subframe, a symbol occupied by PDCCH signaling that carries the control information is included, and remaining symbols are allocated to at least two user equipments UEs to perform transmission with a shortened time delay. For example, in FIG. 5, a part filled with slashes may be allocated to UE 1, a part filled with vertical lines may be allocated to UE 2, and a part filled with dots may be allocated to UE 3. However, the present application is not limited thereto.

In the conventional art, when allocating a time domain resource, a network device allocates all non-PDCCH symbols in an entire 1 ms subframe to user equipment, and a resource occupation time in a time domain is too long. As a result, when receiving data, the user equipment needs to spend a corresponding time of 1 ms on completing data reception, thereby affecting a processing time of the user equipment. In this embodiment of the present application, all non-PDCCH symbols in a subframe may be allocated to multiple user equipments, and the multiple user equipments may occupy all of system bandwidth of allocated symbols or occupy a part of entire system bandwidth (a subcarrier or a subband). This reduces a time of receiving data by user equipment and increases a processing speed of the user equipment.

Optionally, S1200 is specifically: sending a physical downlink shared channel (PDSCH) to the user equipment by using N time domain symbols in a second subframe, where the first K time domain symbols of the N time domain symbols carry the control information, and N and K are positive integers.

That is, as shown in FIG. 6, the control information may occupy all or a part of bandwidth of some symbols, excluding a PDCCH symbol, in a PDSCH area in a 1 ms subframe. To reduce complexity when the user equipment performs detection, a symbol occupied by the control information and a location, in a frequency domain, of a subband occupied by the control information are predefined, or are indicated by the network device to the user equipment by using signaling. This is not limited in the present application.

Optionally, in S1100, the first indication information indicates time domain symbols that are in the first subframe and that are occupied by the time domain resource, and the time domain symbols indicated by the first indication information do not include the time domain symbols occupied by the PDCCH information.

For example, the symbols occupied by the PDCCH information are generally the first 1 to 4 downlink symbols in a subframe. Therefore, assuming that a quantity of symbols actually occupied by the PDCCH information is $L_{DCI}$, locations of symbols occupied by different UEs are indicated by symbols excluding the $L_{DCI}$ symbols. For example, if a subframe has a total of L downlink OFDM symbols (in an LTE system, L=14 for a normal subframe, and L=12 for an extended subframe), a location indicating a shortened time delay is indicated in L–$L_{DCI}$ symbols. A bit mapping manner may be used for indication. For example, $L_{DCI}$ occupies three symbols (that is, occupies a total of three OFDM symbols: a symbol 0, a symbol 1, and a symbol 2). Assuming that a total of three different user equipments with a shortened time delay are supported in the subframe and the three UEs are numbered UE 1 to UE 3 respectively, indication signaling for the three UEs in the subframe is as follows:

UE 1: 11110000000, indicating that four consecutive symbols after a PDCCH symbol are allocated to the UE 1, that is, four symbols numbered 3 to 6 in the subframe are allocated to the UE 1 (numbers of symbols in the subframe start from 0);

UE 2: 00001111000, indicating that four symbols numbered 7 to 10 in the subframe are allocated to the UE 2 (the numbers of the symbols in the subframe start from 0); and UE 3: 00000000111, indicating that three symbols numbered 11 to 13 in the subframe are allocated to the UE 3 (the numbers of the symbols in the subframe start from 0).

Optionally, in S1100, the first indication information indicates time domain symbols that are in the second subframe and that are occupied by the time domain resource, and the time domain symbols indicated by the first indication information does not include numbers of time domain symbols occupied by a PDCCH or the first K time domain symbols.

That is, signaling that indicates, for different UEs, transmission with a shortened time delay is indicated at a location obtained after a downlink OFDM symbol occupied for transmission with a shortened time delay is further excluded, that is, is indicated on L–$L_{DCI}$–$L_{sDCI}$. $L_{DCI}$ is a quantity of symbols used for transmitting downlink control information (DCI) in the prior art. That is, a location indicating a resource for transmission with a shortened time delay is determined according to the quantity of symbols occupied by the DCI and/or a quantity of time domain symbols occupied by the control information.

Optionally, in S1100, the first indication information indicates a time domain symbol set corresponding to time domain symbols that are in a subframe and that are occupied by the time domain resource.

Specifically, a solution of dividing a subframe with a shortened time delay in uplink and downlink may be notified in advance by using signaling or may be predefined. Then the first indication information in the control information is used to indicate which part the time domain resource belongs to. For example, for uplink, symbols used for transmission on an uplink traffic channel may be predefined or may be notified by using signaling. For example, symbols in a subframe may be divided according to a division method shown in Table 1 or Table 2. The first indication information may directly indicate a number of a set corresponding to a symbol. A set division method is not limited in the present application.

TABLE 1

| Part | 0 | 1 | 2 | 3 |
|---|---|---|---|---|
| OFDM symbol | 0-3 | 4-6 | 7-9 | 10-13 |

TABLE 2

| Part | 0 | 1 | 2 | 3 |
|---|---|---|---|---|
| OFDM symbol | 0-2 | 3-6 | 7-9 | 10-13 |

To sum up, all or some of L symbols may be divided into K parts, and then such division is predefined or is notified by using signaling. Then the first indication information only needs to indicate, by using smaller signaling, a part to which a resource, for transmission with a shortened time delay, of current UE belongs. In this way, signaling can be saved.

For downlink, when division is indicated by using signaling or is being predefined, a symbol occupied by the DCI and/or a symbol that may be occupied by the control information needs to be excluded, and then division of remaining symbols is indicated by using signaling or is predefined.

In this embodiment of the present application, optionally, the network device may implicitly indicate a resource location that is occupied by a resource, for transmission with a shortened time delay, of each UE and that is in a downlink subframe and/or an uplink subframe. For example, a location in a time domain and/or a frequency domain may be used to indicate a location, in a subframe, of receiving and/or sending data with a shortened time delay by corresponding receiving UE. For example, frequency domain bandwidth is divided into three parts, and if the control information is at a frequency band i, corresponding data reception/sending with a shortened time delay is in the ith part. In addition, optionally, only a quantity of occupied symbols needs to be indicated in the control information. If time domain division that is based on a shortened time delay and that can be supported in a subframe is defined or is notified by using higher layer signaling, the quantity of occupied symbols does not need to be indicated.

Therefore, according to the wireless communication method in this embodiment of the present application, the network device sends, to the user equipment, the control information including the first indication information that is used to indicate the time domain resource for the first transmission between the user equipment and the network device. The user equipment may obtain, according to the control information, the time domain resource for communicating with the network device by using the first transmission, and communicate with the network device on the obtained time domain resource. The duration of occupying the resource by the one transmission of the first transmission is less than 1 ms. This can reduce a transmission time delay in a communication process, and improve user experience.

The foregoing describes in detail the wireless communication method in the embodiment of the present application from a network device side with reference to FIG. 4 to FIG. 6. The following describes in detail a wireless communication method in another embodiment of the present application from a user equipment side with reference to FIG. 7. It should be understood that interaction between user equipment and a network device, related characteristics and functions, and the like that are described from the network device side are corresponding to descriptions from the user equipment side. For brevity, repeated descriptions are properly omitted.

FIG. 7 is a schematic flowchart of a wireless communication method according to another embodiment of the present application. The method may be executed by user equipment. As shown in FIG. 7, the method 2000 includes the following steps:

S2100. User equipment receives control information sent by a network device, where the control information includes first indication information used to indicate a time domain resource for first transmission between the user equipment and the network device, and duration of occupying a resource by one transmission of the first transmission is less than 1 millisecond.

S2200. The user equipment communicates with the network device according to the control information.

Specifically, the user equipment receives the control information sent by the network device, and communicates with the network device according to the control information. The control information includes the first indication information used to indicate the time domain resource for the first transmission between the user equipment and the network device. Therefore, the user equipment may receive, according to the control information, downlink data that is sent by the network device by using the first transmission, and the user equipment may also send, according to the control information, uplink data to the network device by using the first transmission. The duration of occupying the resource by the one transmission of the first transmission is less than 1 ms.

Therefore, according to the wireless communication method in this embodiment of the present application, the user equipment receives the control information sent by the network device. The control information includes the first indication information used to indicate the time domain resource for the first transmission between the user equipment and the network device. Therefore, the user equipment may communicate with the network device by using the first transmission. This can reduce a transmission time delay in a communication process, and improve user experience.

Optionally, in S2100, the control information carries a radio network temporary identity (RNTI) related to the first transmission.

Optionally, S2100 is specifically: receiving, on the first M time domain symbols in a first subframe, physical downlink control channel (PDCCH) information sent by the network device, where the PDCCH information includes the control information, M is a positive integer, and other time domain symbols, excluding the first M time domain symbols, in time domain symbols included in the first subframe are allocated to multiple user equipments.

Optionally, S2100 is specifically: receiving, on N time domain symbols in a second subframe, a physical downlink shared channel (PDSCH) sent by the network device, where the first K time domain symbols of the N time domain symbols carry the control information, and N and K are positive integers.

Optionally, in S2100, the first indication information indicates time domain symbols that are in the first subframe and that are occupied by the time domain resource, and the time domain symbols indicated by the first indication information do not include the time domain symbols occupied by the PDCCH information.

Optionally, in S2100, the first indication information indicates time domain symbols that are in the second subframe and that are occupied by the time domain resource, and the time domain symbols indicated by the first indication information do not include time domain symbols occupied by a PDCCH or the first K time domain symbols.

Optionally, in S2100, the first indication information indicates a time domain symbol set corresponding to time domain symbols that are in a subframe and that are occupied by the time domain resource.

Optionally, in S2100, the control information further includes at least one of the following information: identification information used to indicate a process number of a hybrid automatic repeat request (HARQ) corresponding to the first transmission, or second indication information used to indicate a retransmission redundancy version corresponding to the first transmission.

Therefore, according to the wireless communication method in this embodiment of the present application, the user equipment receives the control information sent by the network device. The control information includes the first indication information used to indicate the time domain resource for the first transmission between the user equipment and the network device. Therefore, the user equipment may communicate with the network device by using the first transmission. This can reduce a transmission time delay in a communication process, and improve user experience.

Figure 8:
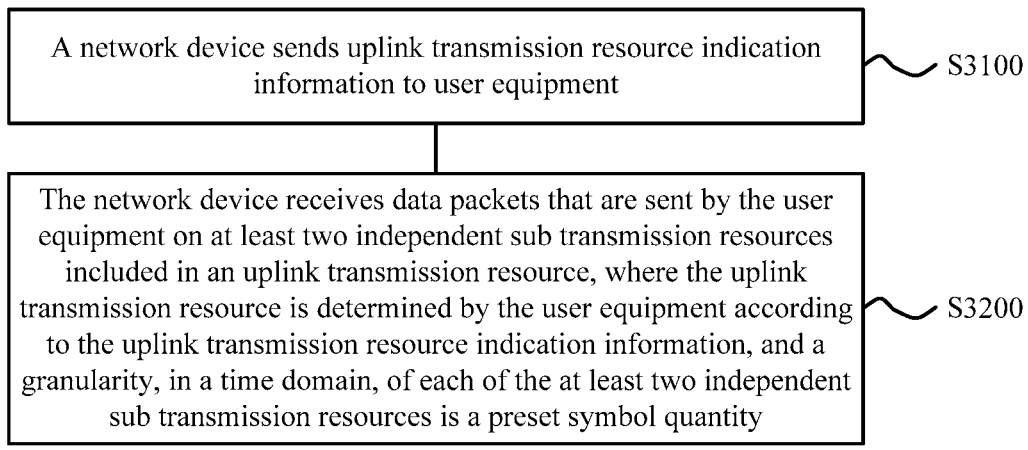
FIG. 8 is a schematic flowchart of a wireless communication method according to still another embodiment of the present application.

The following describes in detail a wireless communication method in still another embodiment of the present application with reference to FIG. 8. The method may be executed by a network device. As shown in FIG. 8, the method 3000 includes the following steps:

S3100. A network device sends uplink transmission resource indication information to user equipment.

S3200. The network device receives data packets that are sent by the user equipment on at least two independent sub transmission resources included in an uplink transmission resource, where the uplink transmission resource is determined by the user equipment according to the uplink transmission resource indication information, and a granularity, in a time domain, of each of the at least two independent sub transmission resources is a preset symbol quantity.

Specifically, after sending the uplink transmission resource indication information to the user equipment, the network device receives the data packets that are sent by the user equipment on the at least two independent sub transmission resources included in the uplink transmission resource that is determined according to the uplink transmission resource indication information. The granularity, in the time domain, of each independent sub transmission resource is the preset symbol quantity.

Therefore, according to the wireless communication method in this embodiment of the present application, the network device sends the uplink transmission resource indication information to the user equipment, and receives the data packets that are sent by the user equipment on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

Optionally, in a transmission time interval (TTI) binding technology in the prior art, a granularity of each independent sub transmission resource is a subframe. In comparison, in the present application, the granularity, in the time domain, of each independent sub transmission resource may be one symbol, two symbols, three symbols, four symbols, or the like. Therefore, according to the method in this embodiment of the present application, a resource allocation manner is more flexible, and a processing time delay is shorter, thereby reducing a transmission time delay and improving user experience and network performance.

It should be understood that the method in this embodiment of the present application may also be applied to downlink transmission. In this case, a network device sends, to user equipment, downlink transmission resource indication information indicating a downlink transmission resource of the user equipment; the user equipment determines, according to the downlink transmission resource indication information, a transmission resource for receiving downlink data, where the transmission resource for receiving downlink data includes at least two independent sub transmission resources, and a granularity, in a time domain, of the at least two independent sub transmission resources is a preset symbol quantity; the user equipment receives downlink data that is sent by the network device by using each independent sub transmission resource; and after receiving all downlink data sent by the network device, the user equipment sends feedback information to the network device.

It should be understood that, in S3200, the data packets sent on the at least two independent sub transmission resources may be different retransmission RVs of a same data packet (corresponding to IR (Incremental Redundancy) retransmission in an existing LTE protocol), or may be same copies of a same data packet (that is, content sent in each retransmitted packet is completely the same, corresponding to CC (Chase Combining) retransmission in an existing LTE protocol). In this embodiment of the present application, optionally, a time, in the time domain, of occupying the uplink transmission resource is greater than 1 ms. In this case, the at least two independent sub transmission resources may be distributed in multiple consecutive subframes.

Figure 9:
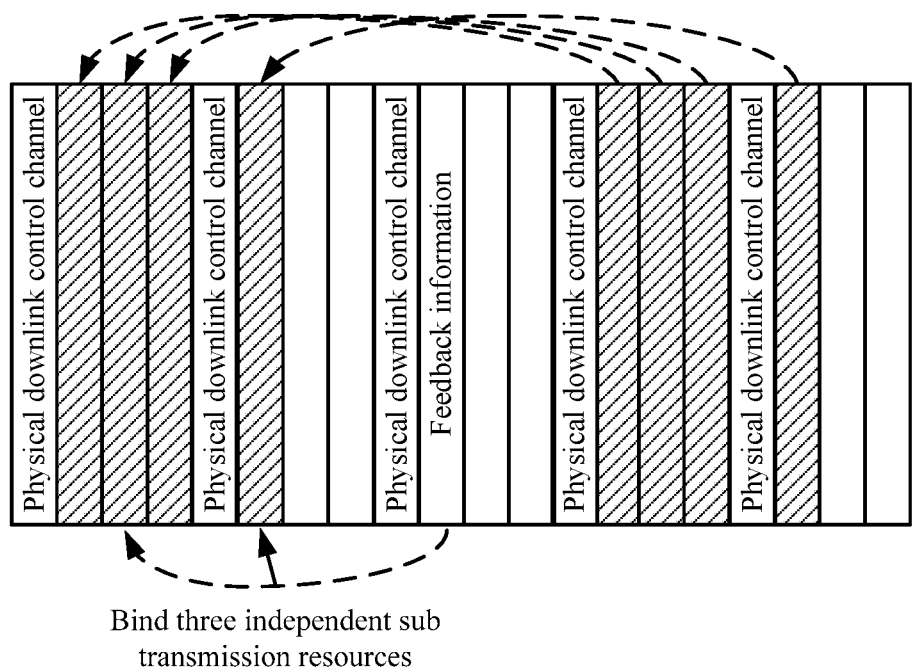
FIG. 9(a) and FIG. 9(b) are schematic diagrams of a location of an independent sub transmission resource according to an embodiment of the present application.
Figure 9:
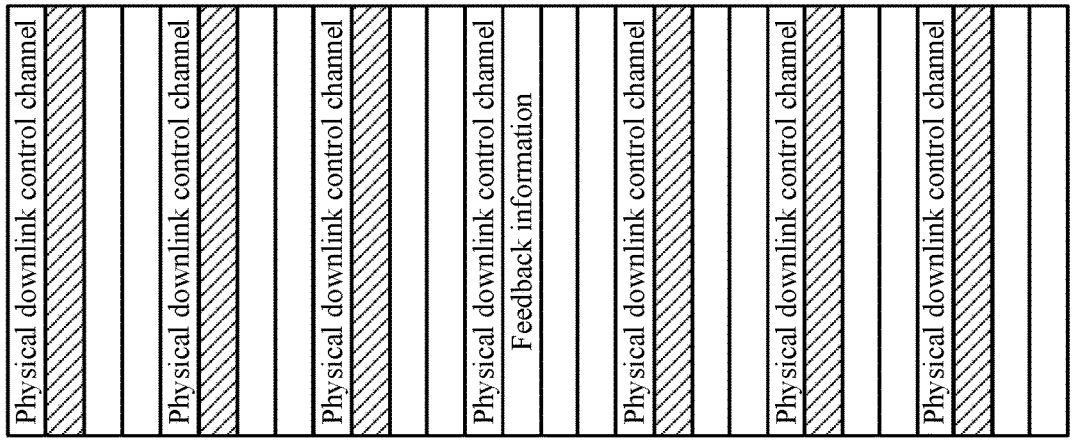

Optionally, in S3100, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources. The allocation type information herein indicates continuous resource allocation or discontinuous resource allocation. The continuous resource allocation means that all non-PDCCH resources of multiple consecutive subframes, excluding a resource occupied by a PDCCH, are allocated, until all to-be-transmitted data and retransmission RVs of the data are completely transmitted. FIG. 9(*a*) is an embodiment of continuous resource allocation. For to-be-transmitted data, some non-PDCCH resources of the first subframe are first allocated, and then a resource with a shortened time delay in a next subframe is occupied. The discontinuous resource allocation means that some non-PDCCH resources of multiple consecutive subframes, excluding a resource occupied by a PDCCH, are allocated, until all to-be-transmitted data and retransmission RVs of the data are completely transmitted. FIG. 9(*b*) is an embodiment of discontinuous resource allocation. To-be-transmitted data occupies only some non-PDCCH resources each time, and three subframes are continuously occupied.

Optionally, in S3100, the uplink transmission resource indication information indicates that the uplink transmission resource is all or a part of a remaining resource, excluding a resource occupied by a physical downlink control channel (PDCCH), in a first subframe.

Figure 10:
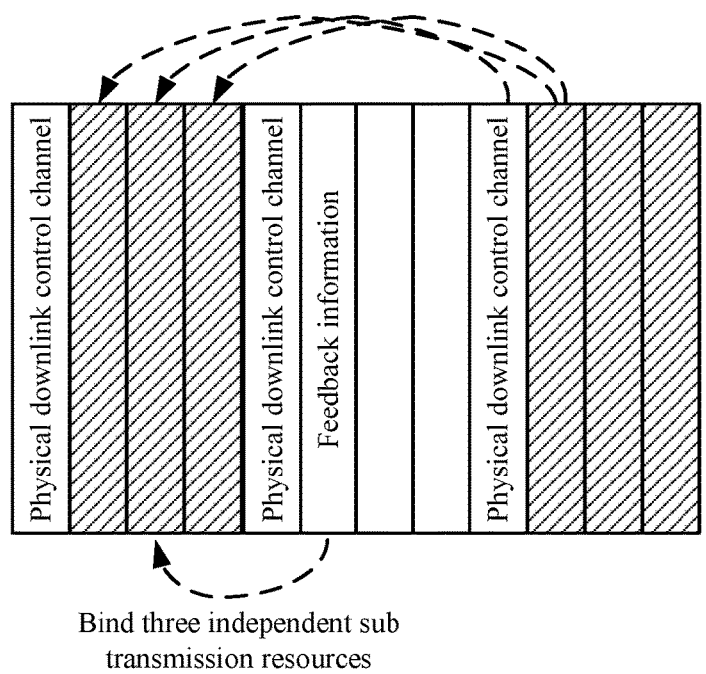
FIG. 10(a) and FIG. 10(b) are schematic diagrams of a location of an independent sub transmission resource according to another embodiment of the present application.
Figure 10:
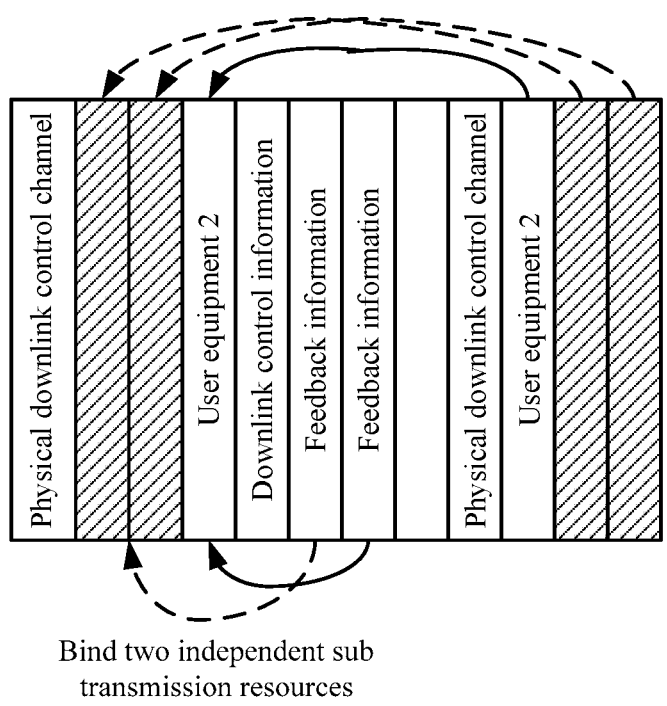

For example, as shown in FIG. 10(*a*), the network device may allocate, as a binding, multiple resources with a shortened time delay, excluding control signaling DCI, in a subframe to UE with a shortened uplink time delay to use. Likewise, a version number of an RV used for retransmission may be predefined, for example, [0, 2, 3, 1]. If a time domain resource for retransmission exceeds four times, a predefined template may be used for repetition. If a quantity of retransmission times is 6, RV versions corresponding to the 6 times are [0, 2, 3, 1, 0, 2]. A subsequent feedback is a feedback for one bound transmission.

Further, when a time domain transmission resource that needs to be bound is less than a maximum resource provided in a 1 ms subframe, only a part of the time domain transmission resource may be used. As shown in FIG. 10(*b*), only two resources for transmission with a shortened time delay are used. The remaining one resource may be allocated to UE 2 for transmission with a shortened time delay.

Optionally, in S3100, the uplink transmission resource indication information indicates that the uplink transmission resource includes a part of a remaining resource, excluding a resource occupied by a PDCCH, in each subframe of M consecutive subframes, where M is an integer greater than or equal to 2.

Alternatively, the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N−K subframes of the N consecutive subframes, where N and K are integers greater than or equal to 1. For example, in FIG. 9(a), a value of N is 2, and a value of K is 1. It should be noted that the value of N is a subframe quantity corresponding to a total quantity of time domain symbols occupied for initially transmitting a data packet and retransmitting the data packet.

For example, when a time domain transmission resource that needs to be bound is greater than a maximum resource provided in a 1 ms subframe, a resource provided in more than one subframe of multiple consecutive subframes may be allocated to UE to use. As shown in FIG. 9(a), all three resources, in the first subframe, for transmission with a shortened time delay, and one resource, in a next adjacent subframe (a subframe that may be used for transmission with a shortened time delay), for transmission with a shortened time delay are used.

Therefore, according to the wireless communication method in this embodiment of the present application, in the foregoing method for continuously allocating at least two independent time-frequency resources with a shortened time delay to UE with a shortened uplink time delay to use, resource allocation is more flexible, and resource use of UE with limited coverage can be preferably ensured. In addition, compared with a prior-art resource allocation manner, this method is more flexible and has a shorter processing time delay.

Further, a resource binding method for transmission with a shortened time delay may be distributed. As shown in FIG. 10(b), resources may be allocated to multiple consecutive available subframes with a shortened time delay. For example, one available resource is allocated to a subframe 0, the second resource is allocated to a subframe 2, and the third resource is allocated to a subframe 3. Further, quantities of resources allocated to subframes may be the same or may be different, and there may be one or more resources.

Therefore, according to the wireless communication method in this embodiment of the present application, an uplink sending time delay of UE on which bound transmission needs to be performed together with a subframe with a shortened time delay is properly increased, but impact on sending of another UE with a shortened time delay is reduced because not all resources, in one subframe, for transmission with a shortened time delay are occupied, so that impact on a HARQ process of the another UE with a shortened time delay is reduced.

The foregoing describes in detail the wireless communication method in the still another embodiment of the present application from a network device side with reference to FIG. 8 to FIG. 10. The following describes in detail a wireless communication method in still another embodiment of the present application from a user equipment side with reference to FIG. 11. It should be understood that interaction between user equipment and a network device, related characteristics and functions, and the like that are described from the network device side are corresponding to descriptions from the user equipment side. For brevity, repeated descriptions are properly omitted.

Figure 11:
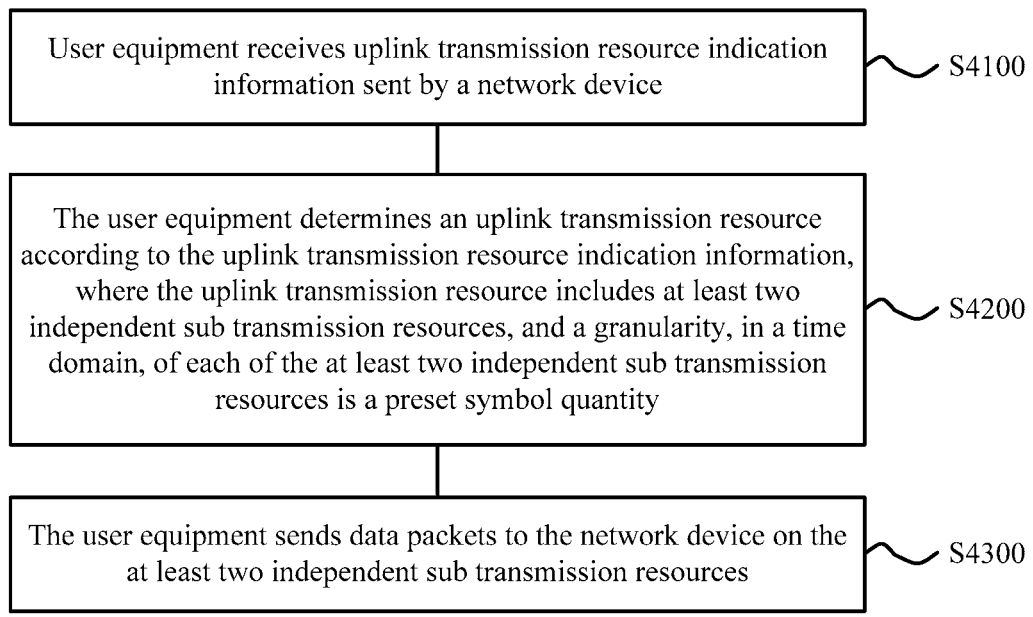
FIG. 11 is a schematic flowchart of a wireless communication method according to still another embodiment of the present application.

FIG. 11 shows a wireless communication method according to still another embodiment of the present application. The method may be executed by user equipment. As shown in FIG. 11, the method 4000 includes the following steps:

S4100. User equipment receives uplink transmission resource indication information sent by a network device.

S4200. The user equipment determines an uplink transmission resource according to the uplink transmission resource indication information, where the uplink transmission resource includes at least two independent sub transmission resources, and a granularity, in a time domain, of each of the at least two independent sub transmission resources is a preset symbol quantity.

S4300. The user equipment sends data packets to the network device on the at least two independent sub transmission resources.

Specifically, after receiving the uplink transmission resource indication information sent by the network device, the user equipment sends the data packets to the network device on the at least two independent sub transmission resources included in the uplink transmission resource that is determined according to the uplink transmission resource indication information. The granularity, in the time domain, of each independent sub transmission resource is the preset symbol quantity.

Therefore, according to the wireless communication method in this embodiment of the present application, the user equipment receives the uplink transmission resource indication information sent by the network device, and sends the data packets to the network device on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

Optionally, in S4100, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

Optionally, in S4100, the uplink transmission resource indication information indicates that the uplink transmission resource is all or a part of a remaining resource, excluding a resource occupied by a physical downlink control channel (PDCCH), in a first subframe.

Optionally, in S4100, the uplink transmission resource indication information indicates that the uplink transmission resource includes a part of a remaining resource, excluding a resource occupied by a PDCCH, in each subframe of M consecutive subframes, where M is an integer greater than or equal to 2.

Alternatively, the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N−K subframes of the N consecutive subframes, where N and K are integers greater than or equal to 1. It should be noted that a value of N is a subframe quantity corresponding to a total quantity of time domain symbols occupied for initially transmitting a data packet and retransmitting the data packet.

Optionally, in S4300, quantities of symbols occupied, in the time domain, by the at least two independent sub transmission resources may be 1, 2, or the like. This is not limited in the present application. In addition, symbols occupied by each independent sub transmission resource may be consecutive symbols in a same subframe, may be non-consecutive symbols in a same subframe, or may be symbols in different subframes. This is not limited in the present application.

Therefore, according to the wireless communication method in this embodiment of the present application, the user equipment receives the uplink transmission resource indication information sent by the network device, and sends the data packets to the network device on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

Figure 12:
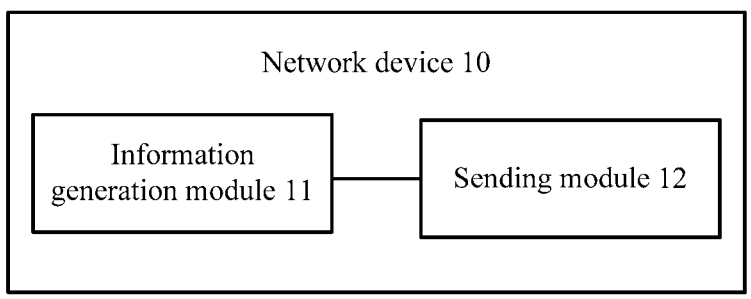
FIG. 12 is a schematic block diagram of a network device according to an embodiment of the present application.

The following specifically describes a network device in an embodiment of the present application with reference to FIG. 12. As shown in FIG. 12, the network device 10 includes:

an information generation module 11, configured to generate control information, where the control information includes first indication information used to indicate a time domain resource for first transmission between user equipment and the network device, and duration of occupying a resource by one transmission of the first transmission is less than 1 millisecond; and a sending module 12, configured to send the control information to the user equipment.

Specifically, the network device generates the control information including the first indication information that is used to indicate the time domain resource for the first transmission between the user equipment and the network device, and sends the control information to the user equipment. The duration of occupying the resource by the one transmission of the first transmission is less than 1 ms.

Therefore, the network device according to this embodiment of the present application sends, to the user equipment, the control information including the first indication information that is used to indicate the time domain resource for the first transmission between the user equipment and the network device. The user equipment may obtain, according to the control information, the time domain resource for communicating with the network device by using the first transmission, and communicate with the network device on the obtained time domain resource. The duration of occupying the resource by the one transmission of the first transmission is less than 1 ms. This can reduce a transmission time delay in a communication process, and improve user experience.

It should be understood that, in this embodiment of the present application, a sending action performed by the sending module 12 may be performed by a transceiver module that has a sending function.

In this embodiment of the present application, optionally, the control information carries a radio network temporary identity (RNTI) related to the first transmission.

In this embodiment of the present application, optionally, that the sending module 12 sends the control information to the user equipment includes: sending physical downlink control channel (PDCCH) information to the user equipment by using the first M time domain symbols in a first subframe, where the PDCCH information includes the control information, M is a positive integer, and other time domain symbols, excluding the first M time domain symbols, in time domain symbols included in the first subframe are allocated to multiple user equipment.

In this embodiment of the present application, optionally, that the sending module 12 sends the control information to the user equipment includes: sending a physical downlink shared channel (PDSCH) to the user equipment by using N time domain symbols in a second subframe, where the first K time domain symbols of the N time domain symbols carry the control information, and N and K are positive integers.

In this embodiment of the present application, optionally, the first indication information indicates time domain symbols that are in the first subframe and that are occupied by the time domain resource, and the time domain symbols indicated by the first indication information do not include the time domain symbols occupied by the PDCCH information.

In this embodiment of the present application, optionally, the first indication information indicates time domain symbols that are in the second subframe and that are occupied by the time domain resource, and the time domain symbols indicated by the first indication information do not include time domain symbols occupied by a PDCCH or the first K time domain symbols.

In this embodiment of the present application, optionally, the first indication information indicates a time domain symbol set corresponding to time domain symbols that are in a subframe and that are occupied by the time domain resource.

In this embodiment of the present application, optionally, the control information further includes at least one of the following information: identification information used to indicate a process number of a hybrid automatic repeat request (HARQ) corresponding to the first transmission, or second indication information used to indicate a retransmission redundancy version corresponding to the first transmission.

It should be understood that the network device 10 according to this embodiment of the present application may correspondingly execute the wireless communication method 1000 in the embodiments of the present application. In addition, the foregoing and other operations and/or functions of the modules in the network device 10 aim to implement the corresponding process in FIG. 4. For brevity, details are not described herein again.

Therefore, the network device according to this embodiment of the present application sends, to the user equipment, the control information including the first indication information that is used to indicate the time domain resource for the first transmission between the user equipment and the network device. The user equipment may obtain, according to the control information, the time domain resource for communicating with the network device by using the first transmission, and communicate with the network device on the obtained time domain resource. The duration of occupying the resource by the one transmission of the first transmission is less than 1 ms. This can reduce a transmission time delay in a communication process, and improve user experience.

Figure 13:
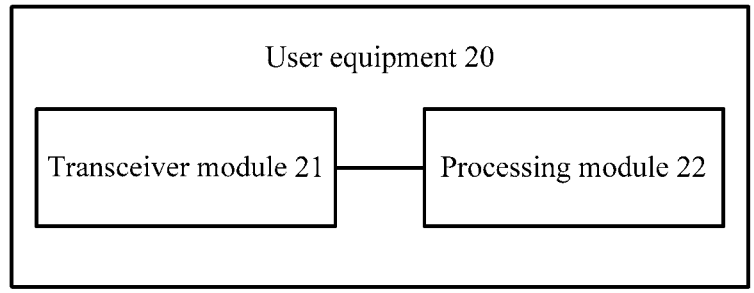
FIG. 13 is a schematic block diagram of user equipment according to an embodiment of the present application.

The following describes in detail user equipment in an embodiment of the present application with reference to FIG. 13. As shown in FIG. 13, the user equipment 20 includes:

a transceiver module 21, configured to receive control information sent by a network device, where the control information includes first indication information used to indicate a time domain resource for first transmission between the user equipment and the network device, and duration of occupying a resource by one transmission of the first transmission is less than 1 millisecond; and a processing module 22, configured to control the transceiver module 21 to communicate with the network device according to the control information.

Specifically, the user equipment receives the control information sent by the network device, and communicates with the network device according to the control information. The control information includes the first indication information used to indicate the time domain resource for the first transmission between the user equipment and the network device. Therefore, the user equipment may receive, according to the control information, downlink data that is sent by the network device by using the first transmission, and the user equipment may also send, according to the control information, uplink data to the network device by using the first transmission. The duration of occupying the resource by the one transmission of the first transmission is less than 1 ms.

Therefore, the user equipment according to this embodiment of the present application receives the control information sent by the network device. The control information includes the first indication information used to indicate the time domain resource for the first transmission between the user equipment and the network device. Therefore, the user equipment may communicate with the network device by using the first transmission. This can reduce a transmission time delay in a communication process, and improve user experience.

It should be understood that, in this embodiment of the present application, a receiving action performed by the transceiver module 21 may be performed by a receiving module that has a receiving function, and a sending action performed by the transceiver module 21 may be performed by a sending module that has a sending function.

In this embodiment of the present application, optionally, the control information carries a radio network temporary identity (RNTI) related to the first transmission.

In this embodiment of the present application, optionally, that the transceiver module 21 receives the control information sent by the network device includes: receiving, on the first M time domain symbols in a first subframe, physical downlink control channel (PDCCH) information sent by the network device, where the PDCCH information includes the control information, M is a positive integer, and other time domain symbols, excluding the first M time domain symbols, in time domain symbols included in the first subframe are allocated to multiple user equipment.

In this embodiment of the present application, optionally, that the transceiver module 21 receives the control information sent by the network device includes: receiving, on N time domain symbols in a second subframe, a physical downlink shared channel (PDSCH) sent by the network device, where the first K time domain symbols of the N time domain symbols carry the control information, and N and K are positive integers.

In this embodiment of the present application, optionally, the first indication information indicates time domain symbols that are in the first subframe and that are occupied by the time domain resource, and the time domain symbols indicated by the first indication information do not include the time domain symbols occupied by the PDCCH information.

In this embodiment of the present application, optionally, the first indication information indicates time domain symbols that are in the second subframe and that are occupied by the time domain resource, and the time domain symbols indicated by the first indication information do not include time domain symbols occupied by a PDCCH or the first K time domain symbols.

In this embodiment of the present application, optionally, the first indication information indicates a time domain symbol set corresponding to time domain symbols that are in a subframe and that are occupied by the time domain resource.

In this embodiment of the present application, optionally, the control information further includes at least one of the following information: identification information used to indicate a process number of a hybrid automatic repeat request (HARQ) corresponding to the first transmission, or second indication information used to indicate a retransmission redundancy version corresponding to the first transmission.

It should be understood that the user equipment 20 according to this embodiment of the present application may correspondingly execute the wireless communication method 2000 in the embodiments of the present application. In addition, the foregoing and other operations and/or functions of the modules in the user equipment 20 aim to implement the corresponding process in FIG. 7. For brevity, details are not described herein again.

Therefore, the user equipment according to this embodiment of the present application receives the control information sent by the network device. The control information includes the first indication information used to indicate the time domain resource for the first transmission between the user equipment and the network device. Therefore, the user equipment may communicate with the network device by using the first transmission. This can reduce a transmission time delay in a communication process, and improve user experience.

Figure 14:
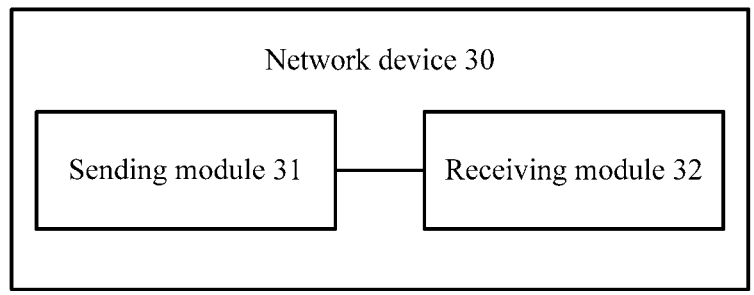
FIG. 14 is a schematic block diagram of a network device according to another embodiment of the present application.

The following describes in detail a network device in another embodiment of the present application with reference to FIG. 14. As shown in FIG. 14, the network device 30 includes:

a sending module 31, configured to send uplink transmission resource indication information to user equipment; and a receiving module 32, configured to receive data packets that are sent by the user equipment on at least two independent sub transmission resources included in an uplink transmission resource, where the uplink transmission resource is determined by the user equipment according to the uplink transmission resource indication information, and a granularity, in a time domain, of each of the at least two independent sub transmission resources is a preset symbol quantity.

Specifically, after sending the uplink transmission resource indication information to the user equipment, the network device receives the data packets that are sent by the user equipment on the at least two independent sub transmission resources included in the uplink transmission resource that is determined according to the uplink transmission resource indication information. The granularity, in the time domain, of each independent sub transmission resource is the preset symbol quantity.

Therefore, the network device in this embodiment of the present application sends the uplink transmission resource indication information to the user equipment, and receives the data packets that are sent by the user equipment on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

It should be understood that, in this embodiment of the present application, a sending action performed by the sending module 31 and a receiving action performed by the receiving module 32 may be performed by a transceiver module that has receiving and sending functions.

In this embodiment of the present application, optionally, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

In this embodiment of the present application, optionally, the uplink transmission resource indication information indicates that the uplink transmission resource is all or a part of a remaining resource, excluding a resource occupied by a physical downlink control channel (PDCCH), in a first subframe.

In this embodiment of the present application, optionally, the uplink transmission resource indication information indicates that the uplink transmission resource includes a part of a remaining resource, excluding a resource occupied by a PDCCH, in each subframe of M consecutive subframes, where M is an integer greater than or equal to 2; or the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N−K subframes of the N consecutive subframes, where N and K are integers greater than or equal to 1.

It should be understood that the network device 30 according to this embodiment of the present application may correspondingly execute the wireless communication method 3000 in the embodiments of the present application. In addition, the foregoing and other operations and/or functions of the modules in the network device 30 aim to implement the corresponding process in FIG. 8. For brevity, details are not described herein again.

Therefore, the network device in this embodiment of the present application sends the uplink transmission resource indication information to the user equipment, and receives the data packets that are sent by the user equipment on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

Figure 15:
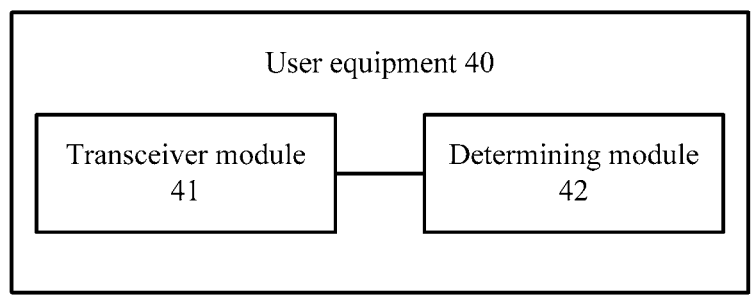
FIG. 15 is a schematic block diagram of user equipment according to another embodiment of the present application.

The following describes in detail user equipment in another embodiment of the present application with reference to FIG. 15. As shown in FIG. 15, the user equipment 40 includes:

a transceiver module 41, configured to receive uplink transmission resource indication information sent by a network device; and a determining module 42, configured to determine an uplink transmission resource according to the uplink transmission resource indication information, where the uplink transmission resource includes at least two independent sub transmission resources, and a granularity, in a time domain, of each of the at least two independent sub transmission resources is a preset symbol quantity.

The transceiver module 41 is further configured to send data packets to the network device on the at least two independent sub transmission resources.

Specifically, after receiving the uplink transmission resource indication information sent by the network device, the user equipment sends the data packets to the network device on the at least two independent sub transmission resources included in the uplink transmission resource that is determined according to the uplink transmission resource indication information. The granularity, in the time domain, of each independent sub transmission resource is the preset symbol quantity.

Therefore, the user equipment in this embodiment of the present application receives the uplink transmission resource indication information sent by the network device, and sends the data packets to the network device on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

It should be understood that, in this embodiment of the present application, a receiving action performed by the transceiver module 41 may be performed by a receiving module that has a receiving function, and a sending action performed by the transceiver module 41 may be performed by a sending module that has a sending function.

In this embodiment of the present application, optionally, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

In this embodiment of the present application, optionally, the uplink transmission resource indication information indicates that the uplink transmission resource is all or a part of a remaining resource, excluding a resource occupied by a physical downlink control channel (PDCCH), in a first subframe.

In this embodiment of the present application, optionally, the uplink transmission resource indication information indicates that the uplink transmission resource includes a part of a remaining resource, excluding a resource occupied by a PDCCH, in each subframe of M consecutive subframes, where M is an integer greater than or equal to 2; or the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N−K subframes of the N consecutive subframes, where N and K are integers greater than or equal to 1.

It should be understood that the user equipment 40 according to this embodiment of the present application may correspondingly execute the wireless communication method 4000 in the embodiments of the present application.

In addition, the foregoing and other operations and/or functions of the modules in the user equipment 40 aim to implement the corresponding process in FIG. 11. For brevity, details are not described herein again.

Therefore, the user equipment in this embodiment of the present application receives the uplink transmission resource indication information sent by the network device, and sends the data packets to the network device on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

An embodiment of the present application further provides a wireless communications system, including the network device 10 shown in FIG. 12 and the user equipment 20 shown in FIG. 13. The network device 10 may correspondingly execute the wireless communication method 1000 in the embodiments of the present application, and the foregoing and other operations and/or functions of modules in the network device 10 aim to implement the corresponding process in FIG. 4. The user equipment 20 may correspondingly execute the wireless communication method 2000 in the embodiments of the present application, and the foregoing and other operations and/or functions of modules in the user equipment 20 aim to implement the corresponding process in FIG. 7. For brevity, details are not described herein again.

The present application further provides a wireless communications system, including the network device 30 shown in FIG. 14 and the user equipment 40 shown in FIG. 15. The network device 30 may correspondingly execute the wireless communication method 3000 in the embodiments of the present application, and the foregoing and other operations and/or functions of modules in the network device 30 aim to implement the corresponding process in FIG. 8. The user equipment 40 may correspondingly execute the wireless communication method 4000 in the embodiments of the present application, and the foregoing and other operations and/or functions of modules in the user equipment 40 aim to implement the corresponding process in FIG. 11. For brevity, details are not described herein again.

Figure 16:
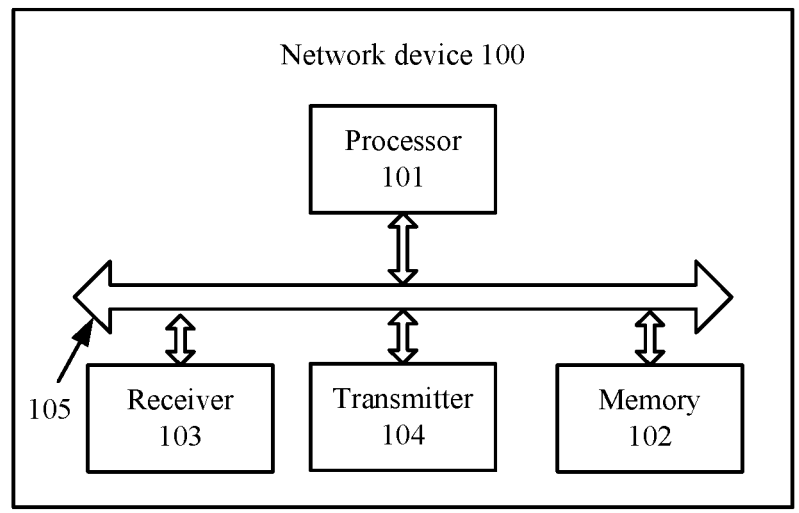
FIG. 16 is a schematic block diagram of a network device according to still another embodiment of the present application.

As shown in FIG. 16, an embodiment of the present application further provides a network device 100. The network device 100 includes a processor 101, a memory 102, a receiver 103, a transmitter 104, and a bus system 105. The bus system 105 is optional. The processor 101, the memory 102, the receiver 103, and the transmitter 104 may be connected by using the bus system 105. The memory 102 is configured to store an instruction. The processor 101 is configured to execute the instruction stored in the memory 102, to control the receiver 103 to receive a signal and control the transmitter 104 to send a signal. The processor 101 is configured to generate control information, where the control information includes first indication information used to indicate a time domain resource for first transmission between user equipment and the network device, and duration of occupying a resource by one transmission of the first transmission is less than 1 millisecond. The transmitter 104 is configured to send the control information to the user equipment.

Therefore, the network device according to this embodiment of the present application sends, to the user equipment, the control information including the first indication information that is used to indicate the time domain resource for the first transmission between the user equipment and the network device. The user equipment may obtain, according to the control information, the time domain resource for communicating with the network device by using the first transmission, and communicate with the network device on the obtained time domain resource. The duration of occupying the resource by the one transmission of the first transmission is less than 1 ms. This can reduce a transmission time delay in a communication process, and improve user experience.

It should be understood that, in this embodiment of the present application, the processor 101 may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 102 may include a read-only memory and a random access memory, and provide an instruction and data for the processor 101. A part of the memory 102 may further include a non-volatile random access memory. For example, the memory 102 may further store device type information.

In addition to a data bus, the bus system 105 may further include a power bus, a control bus, a status signal bus, and the like. However, for clarity of description, all buses are expressed as the bus system 105 in the figure.

In an implementation process, the steps in the foregoing method may be performed by using an integrated logic circuit of hardware in the processor 101 or an instruction in a form of software. The steps of the method disclosed with reference to the embodiments of the present application may be directly performed by a hardware processor, or may be performed by hardware in the processor and a software module. The software module may be located in a mature storage medium in the art, such as a random access memory, a flash memory, a read-only memory, a programmable read-only memory or an electrically erasable programmable memory, or a register. The storage medium is located in the memory 102. The processor 101 reads information from the memory 102 and performs the steps of the foregoing method by using the hardware of the processor 101. To avoid repetition, details are not described herein again.

Optionally, in an embodiment, the control information carries a radio network temporary identity (RNTI) related to the first transmission.

Optionally, in an embodiment, that the transmitter 104 sends the control information to the user equipment includes: sending physical downlink control channel (PDCCH) information to the user equipment by using the first M time domain symbols in a first subframe, where the PDCCH information includes the control information, M is a positive integer, and other time domain symbols, excluding the first M time domain symbols, in time domain symbols included in the first subframe are allocated to multiple user equipments.

Optionally, in an embodiment, that the transmitter 104 sends the control information to the user equipment includes: sending a physical downlink shared channel (PDSCH) to the user equipment by using N time domain symbols in a second subframe, where the first K time domain symbols of the N time domain symbols carry the control information, and N and K are positive integers.

Optionally, in an embodiment, the first indication information indicates time domain symbols that are in the first subframe and that are occupied by the time domain resource, and the time domain symbols indicated by the first indication information do not include the time domain symbols occupied by the PDCCH information.

Optionally, in an embodiment, the first indication information indicates time domain symbols that are in the second subframe and that are occupied by the time domain resource, and the time domain symbols indicated by the first indication information do not include time domain symbols occupied by a PDCCH or the first K time domain symbols.

Optionally, in an embodiment, the first indication information indicates a time domain symbol set corresponding to time domain symbols that are in a subframe and that are occupied by the time domain resource.

Optionally, in an embodiment, the control information further includes at least one of the following information: identification information used to indicate a process number of a hybrid automatic repeat request (HARQ) corresponding to the first transmission, or second indication information used to indicate a retransmission redundancy version corresponding to the first transmission.

It should be understood that the network device 100 according to this embodiment of the present application may be corresponding to the network device 10 in the embodiment of the present application, and may be corresponding to a corresponding body which performs the method in the embodiments of the present application. In addition, the foregoing and other operations and/or functions of the modules in the network device 100 aim to implement the corresponding process of each method in FIG. 4. For brevity, details are not described herein again.

Therefore, the network device according to this embodiment of the present application sends, to the user equipment, the control information including the first indication information that is used to indicate the time domain resource for the first transmission between the user equipment and the network device. The user equipment may obtain, according to the control information, the time domain resource for communicating with the network device by using the first transmission, and communicate with the network device on the obtained time domain resource. The duration of occupying the resource by the one transmission of the first transmission is less than 1 ms. This can reduce a transmission time delay in a communication process, and improve user experience.

Figure 17:
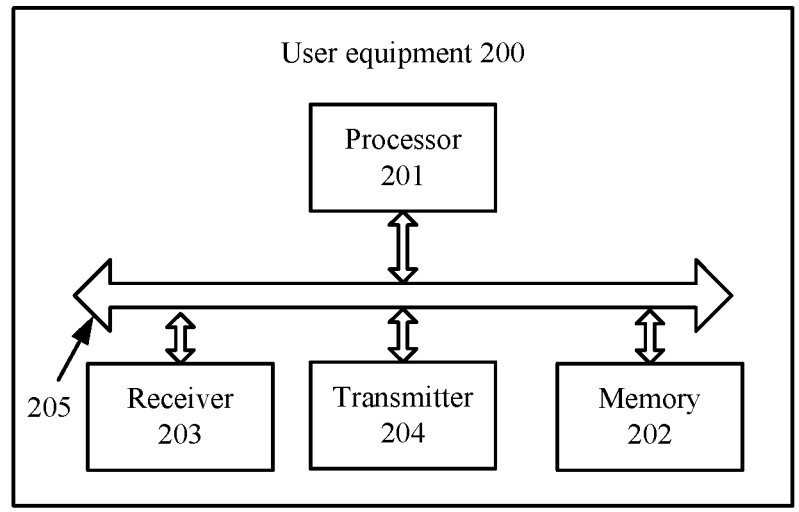
FIG. 17 is a schematic block diagram of user equipment according to still another embodiment of the present application.

As shown in FIG. 17, an embodiment of the present application further provides user equipment 200. The user equipment 200 includes a processor 201, a memory 202, a receiver 203, a transmitter 204, and a bus system 205. The bus system 205 is optional. The processor 201, the memory 202, the receiver 203, and the transmitter 204 may be connected by using the bus system 205. The memory 202 is configured to store an instruction. The processor 201 is configured to execute the instruction stored in the memory 202, to control the receiver 203 to receive a signal and control the transmitter 204 to send a signal. The receiver 203 is configured to receive control information sent by a network device, where the control information includes first indication information used to indicate a time domain resource for first transmission between the user equipment and the network device, and duration of occupying a resource by one transmission of the first transmission is less than 1 millisecond. The processor 201 is configured to control the receiver 203 and the transmitter 204 to communicate with the network device according to the control information.

Therefore, the user equipment according to this embodiment of the present application receives the control information sent by the network device. The control information includes the first indication information used to indicate the time domain resource for the first transmission between the user equipment and the network device. Therefore, the user equipment may communicate with the network device by using the first transmission. This can reduce a transmission time delay in a communication process, and improve user experience.

It should be understood that, in this embodiment of the present application, the processor 201 may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 202 may include a read-only memory and a random access memory, and provide an instruction and data for the processor 201. A part of the memory 202 may further include a non-volatile random access memory. For example, the memory 202 may further store device type information.

In addition to a data bus, the bus system 205 may further include a power bus, a control bus, a status signal bus, and the like. However, for clarity of description, all buses are expressed as the bus system 205 in the figure.

In an implementation process, the steps in the foregoing method may be performed by using an integrated logic circuit of hardware in the processor 201 or an instruction in a form of software. The steps of the method disclosed with reference to the embodiments of the present application may be directly performed by a hardware processor, or may be performed by hardware in the processor and a software module. The software module may be located in a mature storage medium in the art, such as a random access memory, a flash memory, a read-only memory, a programmable read-only memory or an electrically erasable programmable memory, or a register. The storage medium is located in the memory 202. The processor 201 reads information from the memory 202 and performs the steps of the foregoing method by using the hardware of the processor 201. To avoid repetition, details are not described herein again.

Optionally, in an embodiment, the control information carries a radio network temporary identity (RNTI) related to the first transmission.

Optionally, in an embodiment, that the receiver 203 receives the control information sent by the network device includes: receiving, on the first M time domain symbols in a first subframe, physical downlink control channel (PDCCH) information sent by the network device, where the PDCCH information includes the control information, M is a positive integer, and other time domain symbols, excluding the first M time domain symbols, in time domain symbols included in the first subframe are allocated to multiple user equipments.

Optionally, in an embodiment, that the receiver 203 receives the control information sent by the network device includes: receiving, on N time domain symbols in a second subframe, a physical downlink shared channel (PDSCH) sent by the network device, where the first K time domain symbols of the N time domain symbols carry the control information, and N and K are positive integers.

Optionally, in an embodiment, the first indication information indicates time domain symbols that are in the first subframe and that are occupied by the time domain resource, and the time domain symbols indicated by the first indication information do not include the time domain symbols occupied by the PDCCH information.

Optionally, in an embodiment, the first indication information indicates time domain symbols that are in the second subframe and that are occupied by the time domain resource, and the time domain symbols indicated by the first indication information do not include time domain symbols occupied by a PDCCH or the first K time domain symbols.

Optionally, in an embodiment, the first indication information indicates a time domain symbol set corresponding to time domain symbols that are in a subframe and that are occupied by the time domain resource.

Optionally, in an embodiment, the control information further includes at least one of the following information: identification information used to indicate a process number of a hybrid automatic repeat request (HARQ) corresponding to the first transmission, or second indication information used to indicate a retransmission redundancy version corresponding to the first transmission.

It should be understood that the user equipment 200 according to this embodiment of the present application may be corresponding to the user equipment 20 in the embodiment of the present application, and may be corresponding to a corresponding body of the method in the embodiments of the present application. In addition, the foregoing and other operations and/or functions of the modules in the user equipment 200 aim to implement the corresponding process of the method in FIG. 7. For brevity, details are not described herein again.

Therefore, the user equipment according to this embodiment of the present application receives the control information sent by the network device. The control information includes the first indication information used to indicate the time domain resource for the first transmission between the user equipment and the network device. Therefore, the user equipment may communicate with the network device by using the first transmission. This can reduce a transmission time delay in a communication process, and improve user experience.

Figure 18:
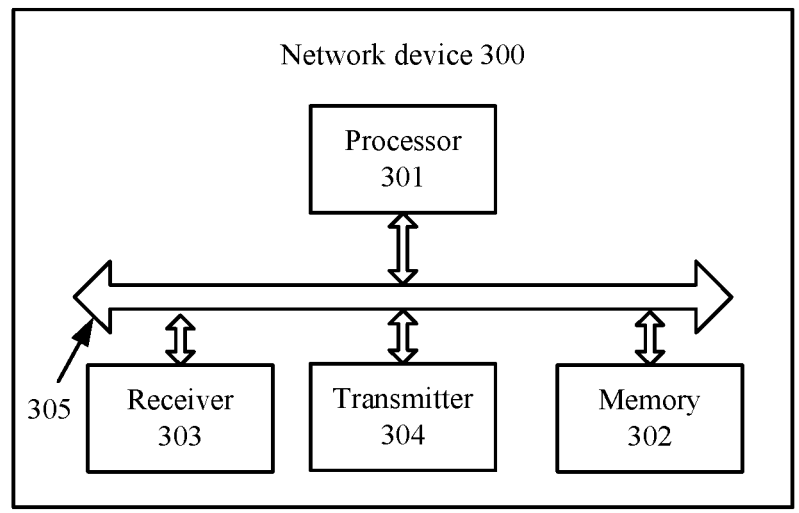
FIG. 18 is a schematic block diagram of a network device according to still another embodiment of the present application.

As shown in FIG. 18, an embodiment of the present application further provides a network device 300. The network device 300 includes a processor 301, a memory 302, a receiver 303, a transmitter 304, and a bus system 305. The bus system 305 is optional. The processor 301, the memory 302, the receiver 303, and the transmitter 304 may be connected by using the bus system 305. The memory 302 is configured to store an instruction. The processor 301 is configured to execute the instruction stored in the memory 302, to control the receiver 303 to receive a signal and control the transmitter 304 to send a signal. The transmitter 304 is configured to send uplink transmission resource indication information to user equipment. The receiver 303 is configured to receive data packets that are sent by the user equipment on at least two independent sub transmission resources included in an uplink transmission resource, where the uplink transmission resource is determined by the user equipment according to the uplink transmission resource indication information, and a granularity, in a time domain, of each of the at least two independent sub transmission resources is a preset symbol quantity.

Therefore, the network device in this embodiment of the present application sends the uplink transmission resource indication information to the user equipment, and receives the data packets that are sent by the user equipment on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

It should be understood that, in this embodiment of the present application, the processor 301 may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 302 may include a read-only memory and a random access memory, and provide an instruction and data for the processor 301. A part of the memory 302 may further include a non-volatile random access memory. For example, the memory 302 may further store device type information.

In addition to a data bus, the bus system 305 may further include a power bus, a control bus, a status signal bus, and the like. However, for clarity of description, all buses are expressed as the bus system 305 in the figure.

In an implementation process, the steps in the foregoing method may be performed by using an integrated logic circuit of hardware in the processor 301 or an instruction in a form of software. The steps of the method disclosed with reference to the embodiments of the present application may be directly performed by a hardware processor, or may be performed by hardware in the processor and a software module. The software module may be located in a mature storage medium in the art, such as a random access memory, a flash memory, a read-only memory, a programmable read-only memory or an electrically erasable programmable memory, or a register. The storage medium is located in the memory 302. The processor 301 reads information from the memory 302 and performs the steps of the foregoing method by using the hardware of the processor 301. To avoid repetition, details are not described herein again.

Optionally, in an embodiment, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

Optionally, in an embodiment, the uplink transmission resource indication information indicates that the uplink transmission resource is all or a part of a remaining resource, excluding a resource occupied by a physical downlink control channel (PDCCH), in a first subframe.

Optionally, in an embodiment, the uplink transmission resource indication information indicates that the uplink transmission resource includes a part of a remaining resource, excluding a resource occupied by a PDCCH, in each subframe of M consecutive subframes, where M is an integer greater than or equal to 2; or the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N−K subframes of the N consecutive subframes, where N and K are integers greater than or equal to 1.

It should be understood that the network device 300 according to this embodiment of the present application may be corresponding to the network device 30 in the embodiment of the present application, and may be corresponding to a corresponding body of the method in the embodiments of the present application. In addition, the foregoing and other operations and/or functions of the modules in the network device 300 aim to implement the corresponding process of the method in FIG. 8. For brevity, details are not described herein again.

Therefore, the network device in this embodiment of the present application sends the uplink transmission resource indication information to the user equipment, and receives the data packets that are sent by the user equipment on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

Figure 19:
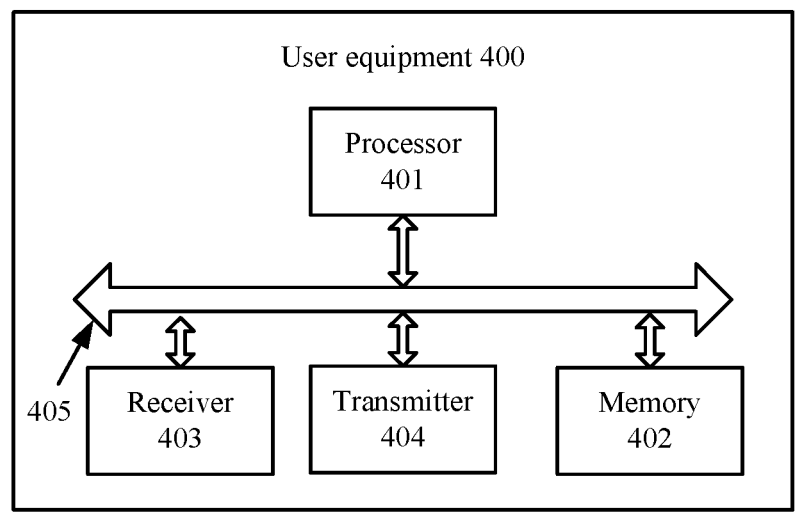
FIG. 19 is a schematic block diagram of user equipment according to still another embodiment of the present application.

As shown in FIG. 19, an embodiment of the present application further provides user equipment 400. The user equipment 400 includes a processor 401, a memory 402, a receiver 403, a transmitter 404, and a bus system 405. The bus system 405 is optional. The processor 401, the memory 402, the receiver 403, and the transmitter 404 may be connected by using the bus system 405. The memory 402 is configured to store an instruction. The processor 401 is configured to execute the instruction stored in the memory 402, to control the receiver 403 to receive a signal and control the transmitter 404 to send a signal. The receiver 403 is configured to receive uplink transmission resource indication information sent by a network device. The processor 401 is configured to determine an uplink transmission resource according to the uplink transmission resource indication information, where the uplink transmission resource includes at least two independent sub transmission resources, and a granularity, in a time domain, of each of the at least two independent sub transmission resources is a preset symbol quantity. The transmitter 404 is configured to send data packets to the network device on the at least two independent sub transmission resources.

Therefore, the user equipment in this embodiment of the present application receives the uplink transmission resource indication information sent by the network device, and sends the data packets to the network device on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

It should be understood that, in this embodiment of the present application, the processor 401 may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 402 may include a read-only memory and a random access memory, and provide an instruction and data for the processor 401. A part of the memory 402 may further include a non-volatile random access memory. For example, the memory 402 may further store device type information.

In addition to a data bus, the bus system 405 may further include a power bus, a control bus, a status signal bus, and the like. However, for clarity of description, all buses are expressed as the bus system 405 in the figure.

In an implementation process, the steps in the foregoing method may be performed by using an integrated logic circuit of hardware in the processor 401 or an instruction in a form of software. The steps of the method disclosed with reference to the embodiments of the present application may be directly performed by a hardware processor, or may be performed by hardware in the processor and a software module. The software module may be located in a mature storage medium in the art, such as a random access memory, a flash memory, a read-only memory, a programmable read-only memory or an electrically erasable programmable memory, or a register. The storage medium is located in the memory 402. The processor 401 reads information from the memory 402 and performs the steps of the foregoing method by using the hardware of the processor 401. To avoid repetition, details are not described herein again.

Optionally, in an embodiment, the uplink transmission resource indication information includes at least one of the following information: allocation type information of the at least two independent sub transmission resources, subframe number information corresponding to each of the at least two independent sub transmission resources, or a time domain symbol and frequency domain location information that are in a subframe and that are corresponding to each of the at least two independent sub transmission resources.

Optionally, in an embodiment, the uplink transmission resource indication information indicates that the uplink transmission resource is all or a part of a remaining resource, excluding a resource occupied by a physical downlink control channel (PDCCH), in a first subframe.

Optionally, in an embodiment, the uplink transmission resource indication information indicates that the uplink transmission resource includes a part of a remaining resource, excluding a resource occupied by a PDCCH, in each subframe of M consecutive subframes, where M is an integer greater than or equal to 2; or the uplink transmission resource indication information indicates that the uplink transmission resource includes a remaining resource, excluding a resource occupied by a PDCCH, in each subframe of the first K subframes of N consecutive subframes, and a part of a remaining resource, excluding a resource occupied by the PDCCH, in each subframe of the last N−K subframes of the N consecutive subframes, where N and K are integers greater than or equal to 1.

It should be understood that the user equipment 400 according to this embodiment of the present application may be corresponding to the user equipment 40 in the embodiment of the present application, and may be corresponding to a corresponding body of the method in the embodiments of the present application. In addition, the foregoing and other operations and/or functions of the modules in the user equipment 400 aim to implement the corresponding process of the method in FIG. 11. For brevity, details are not described herein again.

Therefore, the user equipment in this embodiment of the present application receives the uplink transmission resource indication information sent by the network device, and sends the data packets to the network device on the at least two independent sub transmission resources included in the uplink transmission resource that is determined according to the uplink transmission resource indication information. This can resolve a resource use problem when uplink coverage of user equipment supporting transmission with a shortened time delay is limited, and does not greatly increase a transmission time delay.

It should be understood that "an embodiment" or "an embodiment" mentioned in the whole specification means that particular features, structures, or characteristics related to the embodiment are included in at least one embodiment of the present application. Therefore, "in an embodiment" or "in an embodiment" appearing throughout the specification does not necessarily mean a same embodiment. In addition, these particular features, structures, or characteristics may be combined in one or more embodiments by using any appropriate manner.

It should be understood that sequence numbers of the foregoing processes do not mean execution sequences in the embodiments of the present application. The execution sequences of the processes should be determined according to functions and internal logic of the processes, and should not be construed as any limitation on the implementation processes of the embodiments of the present application.

In addition, the terms "system" and "network" may be used interchangeably in this specification. It should be understood that the term "and/or" in this specification describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that, in the embodiments provided in this application, "B corresponding to A" indicates that B is associated with A, and B may be determined according to A. However, it should be further understood that determining B according to A does not mean that B is determined according to A only, and B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe interchangeability between the hardware and the software, the foregoing generally describes composition and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the integrated unit is implemented in a form of a software functional unit and sold or used as an independent product, the integrated unit may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method performed by a network device, the method comprising:
    sending uplink transmission resource indication information to a terminal device,
        wherein the uplink transmission resource indication information indicates an available resource in each subframe of M consecutive subframes, and
        wherein M is an integer greater than or equal to 2; and
    receiving, in the available resource in the M consecutive subframes, data packets from the terminal device,
        wherein the data packets are redundancy versions (RVs) of a same data packet, or the data packets are copies of a same data packet,
        wherein the data packets are received on the available resource in the M consecutive subframes indicated by the uplink transmission resource indication information, wherein the available resource in each subframe of the M consecutive subframes is a part of symbols in the subframe, and wherein the available resource in each subframe of the M consecutive subframes comprises a same quantity of symbols which are consecutive.

2. The method according to claim 1, wherein the uplink transmission resource indication information comprises information of subframe number associated with each subframe of the M consecutive subframes, or information of a time domain symbol location and a frequency domain location of the available resource in each subframe of the M consecutive subframes.

3. The method according to claim 2, wherein the uplink transmission resource indication information further comprises information of an allocation type of the available resource.

4. The method according to claim 1, wherein the data packets are numbered according to a sequence {0, 2, 3, 1} cyclically in response to the data packets being different retransmission RVs of a same data packet.

5. The method according to claim 1, wherein the available resource in each subframe of the M consecutive subframes is all or a part of a remaining resource, excluding a resource occupied by a physical downlink control channel (PDCCH), in a corresponding subframe.

6. A method performed by a terminal device, the method comprising:

receiving uplink transmission resource indication information from a network device,
wherein the uplink transmission resource indication information indicates an available resource in each subframe of M consecutive subframes, and
wherein M is an integer greater than or equal to 2; and
sending data packets to the network device in the available resource in the M consecutive subframes,
wherein the data packets are redundancy versions (RVs) of a same data packet, or the data packets are copies of a same data packet,
wherein the data packets are received on the available resource in the M consecutive subframes indicated by the uplink transmission resource indication information,
wherein the available resource in each subframe of the M consecutive subframes is a part of symbols in the subframe, and
wherein the available resource in each subframe of the M consecutive subframes comprises a same quantity of symbols which are consecutive.

7. The method according to claim 6, wherein the uplink transmission resource indication information comprises information of subframe number associated with each subframe of the M consecutive subframes, or information of a time domain symbol location and a frequency domain location of the available resource in each subframe of the M consecutive subframes.

8. The method according to claim 7, wherein the uplink transmission resource indication information further comprises information of an allocation type of the available resource.

9. The method according to claim 6, wherein the data packets are numbered according to a sequence {0, 2, 3, 1} cyclically in response to the data packets being different retransmission RVs of a same data packet.

10. The method according to claim 6, wherein the available resource in each subframe of the M consecutive subframes is all or a part of a remaining resource, excluding a resource occupied by a physical downlink control channel (PDCCH), in a corresponding subframe.

11. A network device comprising a transmitter, a processor and a receiver, wherein:

the transmitter is configured to cooperate with the processor to send uplink transmission resource indication information to a terminal device,
wherein the uplink transmission resource indication information indicates an available resource in each subframe of M consecutive subframes, and
wherein M is an integer greater than or equal to 2; and
the receiver is configured to cooperate with the processor to receive data packets from the terminal device in the available resource in the M consecutive subframes,
wherein the data packets are redundancy versions (RVs) of a same data packet, or the data packets are copies of a same data packet,
wherein the data packets are received on the available resource in the M consecutive subframes indicated by the uplink transmission resource indication information,
wherein the available resource in each subframe of the M consecutive subframes is a part of symbols in the subframe, and
wherein the available resource in each subframe of the M consecutive subframes comprises a same quantity of symbols which are consecutive.

12. The network device according to claim 11, wherein the uplink transmission resource indication information comprises information of subframe number associated with each subframe of the M consecutive subframes, or information of a time domain symbol location and a frequency domain location of the available resource in each subframe of the M consecutive subframes.

13. The network device according to claim 12, wherein the uplink transmission resource indication information further comprises information of an allocation type of the available resource.

14. The network device according to claim 11, wherein the data packets are numbered according to a sequence {0, 2, 3, 1} cyclically in response to the data packets being different retransmission RVs of a same data packet.

15. The network device according to claim 11, wherein the available resource in each subframe of the M consecutive subframes is all or a part of a remaining resource, excluding a resource occupied by a physical downlink control channel (PDCCH), in a corresponding subframe.

16. A terminal device comprising a transmitter, a processor and a receiver, wherein:

the receiver is configured to cooperate with the processor to receive uplink transmission resource indication information from a network device,
wherein the uplink transmission resource indication information indicates an available resource in each subframe of M consecutive subframes, and
wherein M is an integer greater than or equal to 2; and
the transmitter is configured to cooperate with the processor to send data packets to the network device in the available resource in the M consecutive subframes,
wherein the data packets are redundancy versions (RVs) of a same data packet, or the data packets are copies of a same data packet,
wherein the data packets are received on the available resource in the M consecutive subframes indicated by the uplink transmission resource indication information, wherein the available resource in each subframe of the M consecutive subframes is a part of symbols in the subframe, and wherein the available resource in each subframe of the M consecutive subframes comprises a same quantity of symbols which are consecutive.

17. The terminal device according to claim 16, wherein the uplink transmission resource indication information comprises information of subframe number associated with each subframe of the M consecutive subframes, or information of a time domain symbol location and a frequency domain location of the available resource in each subframe of the M consecutive subframes.

18. The terminal device according to claim 17, wherein the uplink transmission resource indication information further comprises information of an allocation type of the available resource.

19. The terminal device according to claim 16, wherein the data packets are numbered according to a sequence {0, 2, 3, 1} cyclically in response to the data packets being different retransmission RVs of a same data packet.

20. The terminal device according to claim 16, wherein the available resource in each subframe of the M consecutive subframes is all or a part of a remaining resource, excluding a resource occupied by a physical downlink control channel (PDCCH), in a corresponding subframe.

* * * * *